(12) United States Patent
Baker et al.

(10) Patent No.: US 12,146,728 B1
(45) Date of Patent: Nov. 19, 2024

(54) DUAL IMAGE OFFSETTING DEVICES, SYSTEMS, AND METHODS

(71) Applicants: John L. Baker, Sheridan, IL (US); Jacob D. Baker, Sheridan, IL (US)

(72) Inventors: John L. Baker, Sheridan, IL (US); Jacob D. Baker, Sheridan, IL (US)

(*) Notice: Subject to any disclaimer, the term of this patent is extended or adjusted under 35 U.S.C. 154(b) by 59 days.

(21) Appl. No.: 18/130,859

(22) Filed: Apr. 4, 2023

Related U.S. Application Data

(63) Continuation-in-part of application No. 17/136,910, filed on Dec. 29, 2020, now Pat. No. 11,619,467, which is a continuation-in-part of application No. 16/459,739, filed on Jul. 2, 2019, now Pat. No. 10,877,373.

(60) Provisional application No. 62/693,348, filed on Jul. 2, 2018.

(51) Int. Cl.
*F41G 1/40* (2006.01)
*G02B 23/02* (2006.01)

(52) U.S. Cl.
CPC .............. *F41G 1/40* (2013.01); *G02B 23/02* (2013.01)

(58) Field of Classification Search
CPC . G03F 7/023; G02B 17/0657; G02B 17/0663; G02B 23/04; G02B 23/10; G02B 23/14; G02B 23/16
USPC ............................................ 359/850; 42/118
See application file for complete search history.

(56) References Cited

U.S. PATENT DOCUMENTS

| | | | | |
|---|---|---|---|---|
| 3,749,494 A | * | 7/1973 | Hodges | F41G 1/473 356/17 |
| 4,669,833 A | * | 6/1987 | Mise | G02B 23/16 359/420 |
| 5,497,266 A | * | 3/1996 | Owen | G02B 17/0896 348/E5.09 |
| 6,604,316 B1 | * | 8/2003 | Custer | F41G 1/40 42/118 |
| 7,137,220 B1 | * | 11/2006 | Bradley, Jr. | F41G 1/40 42/118 |
| 7,911,690 B2 | * | 3/2011 | Chapman | F41G 1/46 359/402 |
| 2019/0145737 A1 | * | 5/2019 | Baker | F41G 1/473 42/118 |
| 2020/0081342 A1 | * | 3/2020 | Baker | F41G 1/54 |
| 2021/0310767 A1 | * | 10/2021 | Baker | G02B 26/0816 |

* cited by examiner

*Primary Examiner* — Samir Abdosh
(74) *Attorney, Agent, or Firm* — Eric B. Fugett; Mark A. Pitchford; Pitchford Fugett, PLLC

(57) ABSTRACT

A dual image offsetting apparatus for producing a first offset image pathway and a discrete, second offset image pathway and presenting the offset image pathways to a user or an optic, including at least some of a first reflective surface, a second reflective surface, a third reflective surface, and a fourth reflective surface, wherein the reflective surfaces are attached or coupled so as to provide the first offset image pathway and the second offset image pathway offset from a direct image pathway between a target object and the user or the optic.

20 Claims, 23 Drawing Sheets

DUAL IMAGE OFFSETTING DEVICES, SYSTEMS, AND METHODS

CROSS-REFERENCE TO RELATED APPLICATIONS

This patent application is a continuation-in-part of U.S. patent application Ser. No. 17/136,910, filed Dec. 29, 2020, which is a continuation-in-part of U.S. patent application Ser. No. 16/459,739, filed Jul. 2, 2019, which claims the benefit of U.S. Patent Application Ser. No. 62/693,348, filed Jul. 2, 2018, the disclosures of which are incorporated herein by reference in their entireties.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

NOTICE OF COPYRIGHTED MATERIAL

The disclosure of this patent document contains material that is subject to copyright protection. The copyright owner has no objection to the reproduction by anyone of the patent document or the patent disclosure, as it appears in the Patent and Trademark Office patent file or records, but otherwise reserves all copyright rights whatsoever. Unless otherwise noted, all trademarks and service marks identified herein are owned by the applicant.

BACKGROUND OF THE PRESENT DISCLOSURE

1. Field of the Present Disclosure

The present disclosure relates generally to the field of firearm optics. More specifically, the presently disclosed systems, methods, and/or apparatuses relate to variable range adjusting offset apparatuses and systems and adjustable off axis mirror assemblies.

2. Description of Related Art

Many modern shooting accessories, such as optics, may be attached to a variety of firearms, generally to improve the functionality or usability of those firearms. Known optics include scopes, sights, holographic sights, red dot sights, reflex sights, and the like. These optics may be used wherever firearms or similar weapons may be employed, such as for hunting, law enforcement, military, personal defense, or recreational target shooting. Mounts, such as ring mounts, and quick releases are used to couple an optics to a weapon. For example, a gun may have a scope mount on its action, which may permit an after-market scope to be attached to the gun after it has been purchased. This may improve the user's ability to operate the gun, for example by making it easier for the user to aim the gun at targets.

These optics or optical systems, referred to herein as "optics", however, have functional and practical limitations. Most scopes or targeting devices have a finite range. Additionally, it is often time consuming or difficult to change or adjust a scope or other targeting devices for close quarters or long range targeting. In some cases, complete removal of the scope and mounting system must take place in order to apply the correct component(s), which can create significant weapon re-sighting issues. This can be increasingly problematic as the target distances increase.

Additionally, most optics require an optical line of sight directly from the firearm to the target, particularly as target distances increase. The barrel and the heat emitted from the barrel or any other forward mounted accessory such as a muzzle break, suppressor, or the like, may enter the optical path and obstruct or distort the view of the target, negating the capability to make an accurate shot.

Any discussion of documents, acts, materials, devices, articles, or the like, which has been included in the present specification is not to be taken as an admission that any or all of these matters form part of the prior art base or were common general knowledge in the field relevant to the present disclosure as it existed before the priority date of each claim of this application.

BRIEF SUMMARY OF THE PRESENT DISCLOSURE

In order to overcome certain of the deficiencies experienced by known optics, the present disclosure is directed to various exemplary embodiments of image offsetting apparatuses for producing an offset image and providing that offset image to an optic. The image offsetting apparatus may be a scope, mirrored device, or other image offsetting apparatus that is mounted on a weapon, such as a rifle, that can allow a user to more accurately acquire, view, range, and shoot targets. By utilizing an image offsetting apparatus of the present disclosure, in conjunction with certain optics, the effective range of the optical targeting device may be substantially increased, for example about 200% or more.

Typical optics or aiming devices on typical rifles are offset bore to optical center line up to several inches. This creates a situation in which, at typical zeroing distances (and zero distance) the bullet will rise to meet and then cross above the optical center of the optical targeting device. For close quarter combat, room to room, hostage situations, this offset must be considered and accounted for if a precise shot is required.

Typical risers currently used under a red-dot or scope might raise the optical targeting device 2 inches above a rail. The rail might be ¾ of an inch above the bore (or more) totaling 2¾" inches above the bore center line. If a rifle is your road at 25 yds, for example, the bullet will rise up and meet the optical center of the optical target objecting device and cross it at 25 yds. At 12 yds the bullet is approximately 1.375" inches low. Inside a fifteen foot room the bullet will be 2.2" inches low. Closer engagements will create more offset up to muzzle contact with the target object 90. In hostage situations, if the agent aims at the bridge of the nose, in a 10 foot room, his round could pass thru non-critical body components allowing the perpetrator to potentially execute their hostage or return fire on an agent.

The systems and/or methods of the present disclosure provide a series of optics on the bore line a user may be assured of a critical strike on the perpetrator. Ballistic calculations show essentially zero inches of drop out to and past 60 ft on a typical 0.223 round.

The systems and/or methods of the present disclosure allow an optic to provide an aligned bore point of view removing any error that would exist in a close quarter combat or hostage event. In order to accomplish this the systems and methods of the present disclosure look at left and right images (or upper and lower images), combine the images, and create a vertical (or horizontal) offset to align with the bore.

Combining the two images into one with each using a substantially parallel path will negate the shot error offset.

Combining two independent images would allow the use of one source in one pathway and a second in a second pathway.

Assistance and/or methods of the present disclosure utilize a first offset image pathway and a separate second offset image pathway, direct the first offset image pathway and the second offset image pathway to the receiving optic or eye of the user's eye(s). Any detail provided that is within inches of the primary optic will not focus. The optic will only image its internal near limit.

Images sent to an eye directly will still be useful as the thin line made by the joined surfaces will be microns wide and either not seen or aligned with a vertical axis of the primary optic.

Images sent to an eye directly will not be in focus as the user's eye(s) will focus on a target object meters away. The focus of the eye is at the target object. Secondly to co-align vertical offsets such as bore to optical axis. Current bore offsets in close range engagements always set the bore axis below the optical axis of the primary optic. Many times 2-5 inches of offset will occur.

In close quarters combat this could be a lethal mistake. The operator must shoot to an estimated point in order for the bullet to arrive on the correct spot on the target object. Bending the light from a bore axis and then re-aligning the axis to the primary optical axis will eliminate this issue.

Thus, the image offsetting systems, methods, and/or apparatuses of the present disclosure operate to combine right and left side images into a single image while working with a first offset image pathway and a different second offset image pathway that allow a clean view of target object with no obstacles present. Obstacles could be barrels, designators, lights, range finders and any other equipment placed on a forward position on a current hand guard system. Aligning pathways such as bore offset to allow user's eye(s) a direct bore point of view versus an offset view requiring manual offsets. In other terms correcting and aligning the optical path set by the primary optic and the bore axis.

Accordingly, the present disclosure is directed to certain exemplary embodiments of an image offsetting apparatus for producing an offset image. The image offsetting apparatus of the present disclosure can allow a user to more accurately acquire, view, range, and shoot targets by providing an alternate incoming image pathway to the optical targeting device so the barrel or any forward mounted accessory (such as, for example, a muzzle break, suppressor, or the like) or heat radiating from the barrel or any forward mounted accessory does not distort or obstruct the image entering the optic.

In certain exemplary embodiments, the systems, methods, and apparatuses for adjusting a scope are described. In various exemplary embodiments, the systems, methods, and apparatuses may be a mechanical, optical adjustment. Optical adjustments may be made, for example, vertically and/or horizontally, or anywhere along an x-y axis.

The image offsetting apparatus can be an independent or standalone device or integrated into other optical components and attached to any rail or mount or to any existing component of an optic.

The image offsetting apparatus utilizes a series of mirrors and or lenses to create an alternate or offset image pathway from the target object to the optic. The image offsetting apparatus could be utilized in conjunction with a large variety of aiming devices. Such devices can include, but are not limited to, scopes, night vision optics, red dots, holographic devices, ACOGs, the TARAC, laser targeting devices, iron sights, mechanical devices, and the like.

The image offsetting apparatus can further be applied in layers and/or steps that can allow stepped adjustments for different pathways. Such pathways may allow for the adjusting of the zero of a rifle or reticle in any vertical or horizontal direction. It may further be appreciated that the zero of a rifle can be adjusted in any desired various distance increments by increasing or decreasing the angle of incidence of the mirror and or lens in the exemplary embodiments described herein.

In various exemplary, nonlimiting embodiments, the image offsetting apparatus for producing an offset image comprises a mirror assembly wherein the mirror assembly comprises a first component mirror and a second component mirror, wherein the mirror assembly is attached or coupled so as to provide the offset image pathway offset from a direct image pathway between a target object and the optic.

In various exemplary, nonlimiting embodiments, the present disclosure provides an image offsetting apparatus for producing an offset image pathway and presenting the offset image pathway to a user or an optical targeting device, including at least some of a mirror assembly wherein the mirror assembly comprises a first component mirror and a second component mirror, wherein the mirror assembly is attached or coupled so as to provide the offset image pathway offset from a direct image pathway between a target object and the optic.

In certain exemplary embodiments, the offset image pathway is provided within a plane that is substantially horizontally offset from the direct image pathway.

In certain exemplary embodiments, a barrel does not intercept the offset image pathway between the target object and the optic.

In certain exemplary embodiments, heat radiating from a barrel does not intercept the offset image pathway between the target object and the optic.

In certain exemplary embodiments, the image offsetting apparatus further comprises one or more lenses aligned with the first component mirror and/or the second component mirror.

In various exemplary, nonlimiting embodiments, the present disclosure provides an image offsetting apparatus for producing an offset image pathway for a target image of a target and providing the offset target image to a user or an optical targeting device, including at least some of a housing having an optical cavity formed therein, wherein the optical cavity extends from an incoming image aperture formed through a first portion of the housing to an outgoing image aperture formed through a second portion of the housing, wherein the housing is positionable between the user or the optical targeting device and a target; at least one first rotationally adjustable component mirror rotatably positioned within at least a portion of the optical cavity; and at least one second rotationally adjustable component mirror rotatably positioned within at least a portion of the optical cavity, wherein a reflective surface of the at least one first rotationally adjustable component mirror is positioned so as to receive the target image through the incoming image aperture and reflect the target image to a reflective surface of the at least one second rotationally adjustable component mirror, and wherein the reflective surface of the at least one second rotationally adjustable component mirror is positioned so as to receive the target image from the reflective surface of the at least one first rotationally adjustable component mirror and reflect the target image through the outgoing image aperture, such that the target image entering the incoming image aperture exits the outgoing image aperture at a determined offset that is offset from and at least substantially parallel to a direct image pathway from the target to the optical targeting device.

In certain exemplary embodiments, a first adjustment knob is attached or coupled to the at least one first rotatably adjustable component mirror and wherein rotational movement of the first adjustment knob results in rotational movement of the at least one first rotatably adjustable component mirror.

In certain exemplary embodiments, a second adjustment knob is attached or coupled to the at least one second rotatably adjustable component mirror and wherein rotational movement of the second adjustment knob results in rotational movement of the at least one second rotatably adjustable component mirror.

In certain exemplary embodiments, rotational adjustment of the at least one first rotationally adjustable component mirror adjusts an angle at which the target image is reflected through the outgoing image aperture.

In certain exemplary embodiments, rotational adjustment of the at least one second rotationally adjustable component mirror adjusts an angle at which the target image is reflected through the outgoing image aperture.

In certain exemplary embodiments, the at least one first rotationally adjustable component mirror is attached or coupled to a first adjustable mirror holder and/or the at least one second rotationally adjustable component mirror is attached or coupled to a second adjustable mirror holder.

In certain exemplary embodiments, the at least one first rotationally adjustable component mirror and/or the at least one second rotatably adjustable component mirror is a plane mirror or a magnifying mirror.

In certain exemplary embodiments, the image offsetting apparatus is positioned between the user or the optical targeting device and the target.

In certain exemplary embodiments, the offset image pathway is offset from longitudinal axis of the optical targeting device and offset from a vertical plane formed between a longitudinal axis of the optical targeting device and a longitudinal axis of a barrel of a firearm to which the optical targeting device and the image offsetting apparatus are attached or coupled.

In various exemplary, nonlimiting embodiments, the present disclosure provides an image offsetting apparatus for producing an offset image pathway for a target image of a target and providing the offset target image to a user or an optical targeting device, including at least some of a housing having an optical cavity formed therein, wherein the optical cavity extends from an incoming image aperture formed through a first portion of the housing to an outgoing image aperture formed through a second portion of the housing, wherein the housing is positionable between the user or the optical targeting device and a target; and a mirror assembly positioned within at least a portion of the optical cavity, wherein the mirror assembly receives the target image through the incoming image aperture and reflects the target image through the outgoing image aperture, such that the target image entering the incoming image aperture exits the outgoing image aperture at a determined offset that is offset from and at least substantially parallel to a direct image pathway from the target to the optical targeting device, and wherein the offset image pathway is offset from longitudinal axis of the optical targeting device and offset from a vertical plane formed between a longitudinal axis of the optical targeting device and a longitudinal axis of a barrel of a firearm to which the optical targeting device and the image offsetting apparatus are attached or coupled.

In certain exemplary embodiments, the mirror assembly comprises at least one first rotatably adjustable component mirror and at least one second rotatably adjustable component mirror.

In various exemplary, nonlimiting embodiments, the offset image pathway is provided within a plane that is substantially horizontally offset from the direct image pathway.

In various exemplary, nonlimiting embodiments, a barrel does not intercept the offset image pathway between the target object and the optic.

In various exemplary, nonlimiting embodiments, heat radiating from a barrel does not intercept the offset image pathway between the target object and the optic.

In various exemplary, nonlimiting embodiments, the image offsetting apparatus further comprises one or more lenses aligned with the first component mirror and/or the second component mirror.

In various exemplary, nonlimiting embodiments, the present disclosure provides an image offsetting apparatus for producing an offset image pathway and presenting the offset image pathway to a user or an optical targeting device, including at least some of a prism element wherein the prism element comprises a first reflective surface/refracting face and a second reflective surface/refracting face, wherein the prism element is attached or coupled between the target object and the user or the optical targeting device so as to provide the offset image pathway offset from a direct image pathway between a target object and the user or the optical targeting device.

In certain exemplary embodiments, the offset image pathway is provided within a plane that is substantially horizontally offset from the direct image pathway.

In certain exemplary embodiments, a barrel does not intercept the offset image pathway between the target object and the user or the optical targeting device.

In certain exemplary embodiments, heat radiating from a barrel or a forward mounted accessory does not intercept the offset image pathway between the target object and the user or the optical targeting device.

In certain exemplary embodiments, the image offsetting apparatus further comprises one or more lenses aligned with the first reflective surface/refracting face and/or the second reflective surface/refracting face.

In certain exemplary embodiments, the image offsetting apparatus further comprises one or more optical lenses aligned with the first reflective surface/refracting face and/or the second reflective surface/refracting face.

In various exemplary, nonlimiting embodiments, the present disclosure provides an image offsetting apparatus for producing an offset image pathway and presenting the offset image pathway to a user or an optical targeting device, including at least some of a housing having an optical cavity formed therein, wherein the optical cavity extends from an incoming image aperture formed through a first portion of the housing to an outgoing image aperture formed through a second portion of the housing, wherein the housing is positionable between the user or the optical targeting device and a target; an adjustable prism element rotatably positioned within at least a portion of the optical cavity, wherein the prism element includes at least one first reflective surface/refracting face and at least one second reflective surface/refracting face, wherein the at least one first reflective surface/refracting face is positioned so as to receive the target image through the incoming image aperture and reflect the target image to the at least one second reflective surface/refracting face, and wherein the at least one second reflective surface/refracting face is positioned so as to receive the target image from the reflective surface of the at least one first reflective surface/refracting face and reflect the target image through the outgoing image aperture, such that the target image entering the incoming image aperture exits the outgoing image aperture at a determined offset that is offset from and at least substantially parallel to a direct image pathway from the target to the optical targeting device.

In certain exemplary embodiments, at least one adjustment knob is attached or coupled to the prism element and wherein rotational movement of the at least one adjustment knob results in rotational movement of the prism element.

In certain exemplary embodiments, rotational adjustment of the at least one first reflective surface/refracting face adjusts an angle at which the target image is reflected through the outgoing image aperture.

In certain exemplary embodiments, rotational adjustment of the at least one second reflective surface/refracting face adjusts an angle at which the target image is reflected through the outgoing image aperture.

In certain exemplary embodiments, the image offsetting apparatus further comprises one or more lenses aligned with the first reflective surface/refracting face and/or the second reflective surface/refracting face.

In certain exemplary embodiments, each of the one or more lenses comprises an optical wedge, wedge assembly, or offset lens assembly.

In certain exemplary embodiments, each of the one or more lenses is formed of a singular index material or of a multi-index chromatic correcting material.

In certain exemplary embodiments, the image offsetting apparatus further comprises one or more optical lenses aligned with the first reflective surface/refracting face and/or the second reflective surface/refracting face.

In certain exemplary embodiments, each of the one or more optical lenses comprises a substantially coplanar, bioconvex, plano-convex, positive meniscus, negative meniscus, plano-concave, or bioconcave lens.

In certain exemplary embodiments, each of the one or more optical lenses adds or subtracts magnification to the target image.

In certain exemplary embodiments, the image offsetting apparatus is positioned between the user or the optical targeting device and the target.

In certain exemplary embodiments, the offset image pathway is offset from a longitudinal axis of the optical targeting device and offset from a vertical plane formed between the longitudinal axis of the optical targeting device and a longitudinal axis of a barrel of a firearm to which the optical targeting device and the image offsetting apparatus are attached or coupled.

In various exemplary, nonlimiting embodiments, the present disclosure provides an image offsetting apparatus for producing an offset image pathway and presenting the offset image pathway to a user or an optical targeting device, including at least some of a housing having an optical cavity formed therein, wherein the optical cavity extends from an incoming image aperture formed through a first portion of the housing to an outgoing image aperture formed through a second portion of the housing; and a prism element positioned within at least a portion of the optical cavity, wherein the prism element receives the target image through the incoming image aperture and reflects the target image through the outgoing image aperture, such that the target image entering the incoming image aperture exits the outgoing image aperture at a determined offset that is offset from a direct image pathway from the target to the optical targeting device.

In certain exemplary embodiments, the housing is positionable between the user or the optical targeting device and a target.

In certain exemplary embodiments, the target image exits the outgoing image aperture at a determined offset that is at least substantially parallel to the direct image pathway from the target to the optical targeting device.

In certain exemplary embodiments, the offset image pathway is offset from a longitudinal axis of the optical targeting device and offset from a vertical plane formed between the longitudinal axis of the optical targeting device and a longitudinal axis of a barrel of a firearm to which the optical targeting device and the image offsetting apparatus are attached or coupled.

In certain exemplary embodiments, the prism element comprises at least one first reflective surface/refracting face and at least one second reflective surface/refracting face.

In various exemplary, nonlimiting embodiments, the present disclosure provides a dual image offsetting apparatus for producing a first offset image pathway and a discrete, second offset image pathway and presenting the offset image pathways to a user or an optical targeting device, including at least some of a first reflective surface, a second reflective surface, a third reflective surface, and a fourth reflective surface, wherein the first reflective surface, the second reflective surface, the third reflective surface, and the fourth reflective surface are attached or coupled between the target object and the user or the optical targeting device so as to receive, on the first offset image pathway, a first target image of the target object through a first incoming image aperture and so as to receive, on the second offset image pathway, a second target image of the target object through a second incoming image aperture, reflect the first target image of the target object, on the first offset image pathway, through an outgoing image aperture, and reflect the second target image of the target object, on the second offset image pathway, through the outgoing image aperture, such that the first offset image pathway is offset from the second offset image pathway.

In various exemplary, nonlimiting embodiments, heat radiating from a barrel or a forward mounted accessory does not intercept the offset image pathway between the target object and the user or the optical targeting device.

In various exemplary, nonlimiting embodiments, the first reflective surface, the second reflective surface, the third reflective surface, and the fourth reflective surface are each rotatably positioned within at least a portion of an optical cavity of a housing.

In various exemplary, nonlimiting embodiments, the second reflective surface is positionable so as to receive the first target image from the third reflective surface.

In various exemplary, nonlimiting embodiments, the first target image is received through the first incoming image aperture, reflected from the third reflective surface to the second reflective surface and from the second reflective surface through the outgoing image aperture.

In various exemplary, nonlimiting embodiments, the first reflective surface is positionable so as to receive the second target image from the fourth reflective surface.

In various exemplary, nonlimiting embodiments, the second target image is received through the second incoming image aperture, reflected from the fourth reflective surface to the first reflective surface and from the first reflective surface through the outgoing image aperture.

In various exemplary, nonlimiting embodiments, the present disclosure provides a dual image offsetting apparatus for producing a first offset image pathway for a first target image of a target and a discrete, second offset image pathway for a second target image of a target and providing the offset target images to a user or an optical targeting device, including at least some of a housing having an optical cavity formed therein, wherein the optical cavity extends from a first incoming image aperture and a second incoming image aperture formed through a first portion of the housing to an outgoing image aperture formed through a second portion of the housing, wherein the housing is positionable between the user or the optical targeting device and a target; and a first reflective surface, a second reflective surface, a third reflective surface, and a fourth reflective surface, wherein the first reflective surface, the second reflective surface, the third reflective surface, and the fourth reflective surface are attached or coupled between the target object and the user or the optical targeting device so as to receive, on the first offset image pathway, a first target image of the target object through a first incoming image aperture and so as to receive, on the second offset image pathway, a second target image of the target object through a second incoming image aperture, reflect the first target image of the target object, on the first offset image pathway, through an outgoing image aperture, and reflect the second target image of the target object, on the second offset image pathway, through the outgoing image aperture, such that the first offset image pathway is offset from the second offset image pathway.

In various exemplary, nonlimiting embodiments, rotational adjustment of the second reflective surface and/or the third reflective surface adjusts an angle at which the first target image is reflected through the outgoing image aperture.

In various exemplary, nonlimiting embodiments, the second reflective surface is positionable so as to receive the first target image from the third reflective surface.

In various exemplary, nonlimiting embodiments, the first target image is received through the first incoming image aperture, reflected from the third reflective surface to the second reflective surface and from the second reflective surface through the outgoing image aperture.

In various exemplary, nonlimiting embodiments, rotational adjustment of the first reflective surface and/or the fourth reflective surface adjusts an angle at which the second target image is reflected through the outgoing image aperture.

In various exemplary, nonlimiting embodiments, the first reflective surface is positionable so as to receive the second target image from the fourth reflective surface.

In various exemplary, nonlimiting embodiments, the second target image is received through the second incoming image aperture, reflected from the fourth reflective surface to the first reflective surface and from the first reflective surface through the outgoing image aperture.

In various exemplary, nonlimiting embodiments, the dual image offsetting apparatus is positionable between the user or the optical targeting device and the target.

In various exemplary, nonlimiting embodiments, the present disclosure provides a dual image offsetting apparatus for producing a first offset image pathway for a first target image of a target and a discrete, second offset image pathway for a second target image of a target and providing the offset target images to a user or an optical targeting device, including at least some of a housing having an optical cavity formed therein, wherein the optical cavity extends from a first incoming image aperture and a second incoming image aperture formed through a first portion of the housing to an outgoing image aperture formed through a second portion of the housing; and a first reflective surface, a second reflective surface, a third reflective surface, and a fourth reflective surface, wherein the second reflective surface is positionable so as to receive the first target image from the third reflective surface, wherein the first target image is received through the first incoming image aperture, reflected from the third reflective surface to the second reflective surface and from the second reflective surface through the outgoing image aperture, wherein the first reflective surface is positionable so as to receive the second target image from the fourth reflective surface, wherein the second target image is received through the second incoming image aperture, reflected from the fourth reflective surface to the first reflective surface and from the first reflective surface through the outgoing image aperture, wherein the first reflective surface, the second reflective surface, the third reflective surface, and the fourth reflective surface are attached or coupled between the target object and the user or the optical targeting device so as to receive, on the first offset image pathway, a first target image of the target object through a first incoming image aperture and so as to receive, on the second offset image pathway, a second target image of the target object through a second incoming image aperture, reflect the first target image of the target object, on the first offset image pathway, through an outgoing image aperture, and reflect the second target image of the target object, on the second offset image pathway, through the outgoing image aperture, such that the first offset image pathway is offset from the second offset image pathway.

In various exemplary, nonlimiting embodiments, the housing is positionable between the user or the optical targeting device and a target.

In various exemplary, nonlimiting embodiments, the first reflective surface, the second reflective surface, the third reflective surface, and the fourth reflective surface are each rotatably positioned within at least a portion of an optical cavity of a housing.

In various exemplary, nonlimiting embodiments, rotational adjustment of the second reflective surface and/or the third reflective surface adjusts an angle at which the first target image is reflected through the outgoing image aperture.

In various exemplary, nonlimiting embodiments, rotational adjustment of the first reflective surface and/or the fourth reflective surface adjusts an angle at which the second target image is reflected through the outgoing image aperture.

Accordingly, the presently disclosed systems, methods, and/or apparatuses separately and optionally provide an alternate or offset image pathway from the target object to an optic.

The presently disclosed systems, methods, and/or apparatuses separately and optionally provide an image offsetting apparatus that produces an offset image pathway such that a barrel or any forward mounted accessory does not intercept the offset image pathway between a target object and an optic.

The presently disclosed systems, methods, and/or apparatuses separately and optionally provide an image offsetting apparatus that produces an offset image pathway such that heat radiating from a barrel or any forward mounted accessory does not intercept the offset image pathway between a target object and an optic.

The presently disclosed systems, methods, and/or apparatuses separately and optionally provide an image offsetting apparatus that produces a near "binocular" type of view with no barrel or component interference.

These and other aspects, features, and advantages of the presently disclosed systems, methods, and/or apparatuses are described in or are apparent from the following detailed description of the exemplary, non-limiting embodiments of the presently disclosed systems, methods, and/or apparatuses and the accompanying figures. Other aspects and features of embodiments of the presently disclosed systems, methods, and/or apparatuses will become apparent to those of ordinary skill in the art upon reviewing the following description of specific, exemplary embodiments of the presently disclosed systems, methods, and/or apparatuses in concert with the figures. While features of the presently disclosed systems, methods, and/or apparatuses may optionally be discussed relative to certain embodiments and figures, all embodiments of the presently disclosed systems, methods, and/or apparatuses can include one or more of the features discussed herein.

Further, while one or more embodiments may optionally be discussed as having certain advantageous features, one or more of such features may optionally also be used with the various embodiments of the systems, methods, and/or apparatuses discussed herein. In similar fashion, while exemplary embodiments may optionally be discussed below as device, system, or method embodiments, it is to be understood that such exemplary embodiments can be implemented in various devices, systems, and methods of the presently disclosed systems, methods, and/or apparatuses.

Any benefits, advantages, or solutions to problems that are described herein with regard to specific embodiments are not intended to be construed as a critical, required, or essential feature(s) or element(s) of the presently disclosed systems, methods, and/or apparatuses or the claims.

BRIEF DESCRIPTION OF THE SEVERAL VIEWS OF THE DRAWINGS

As required, detailed exemplary embodiments of the presently disclosed systems, methods, and/or apparatuses are disclosed herein; however, it is to be understood that the disclosed embodiments are merely exemplary of the presently disclosed systems, methods, and/or apparatuses that may optionally be embodied in various and alternative forms, within the scope of the presently disclosed systems, methods, and/or apparatuses. The figures are not necessarily to scale; some features may optionally be exaggerated or minimized to illustrate details of particular components. Therefore, specific structural and functional details disclosed herein are not to be interpreted as limiting, but merely as a basis for the claims and as a representative basis for teaching one skilled in the art to employ the presently disclosed systems, methods, and/or apparatuses.

The exemplary embodiments of the presently disclosed systems, methods, and/or apparatuses will be described in detail, with reference to the following figures, wherein like reference numerals refer to like parts throughout the several views, and wherein.

DETAILED DESCRIPTION OF EXEMPLARY EMBODIMENTS OF THE DISCLOSURE

Figure 1:
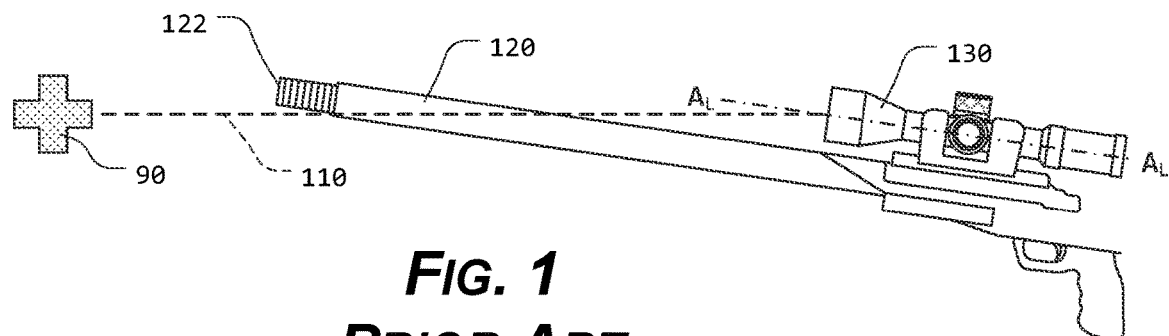
FIG. 1 illustrates a side view of an exemplary direct image pathway in its standard position before entering an existing optics device, wherein the direct image pathway is intercepted by the barrel and muzzle end obstructing line of sight to the optic.

For simplicity and clarification, the design factors and operating principles for the image offsetting apparatuses, systems, and methods according to the present disclosure are explained with reference to various exemplary embodiments of the image offsetting systems, methods, and apparatuses according to the presently disclosed systems, methods, and/or apparatuses. The basic explanation of the design factors and operating principles of the image offsetting systems, methods, and apparatuses is applicable for the understanding, design, and operation of the image offsetting systems, methods, and apparatuses of the presently disclosed systems, methods, and/or apparatuses. It should be appreciated that the image offsetting systems, methods, and apparatuses can be adapted to many applications where image offsetting systems, methods, and apparatuses can be used.

As used herein, the word "may" is meant to convey a permissive sense (i.e., meaning "having the potential to"), rather than a mandatory sense (i.e., meaning "must"). Unless stated otherwise, terms such as "first" and "second" are used to arbitrarily distinguish between the exemplary embodiments and/or elements such terms describe. Thus, these terms are not necessarily intended to indicate temporal or other prioritization of such exemplary embodiments and/or elements.

The term "coupled", as used herein, is defined as connected, although not necessarily directly, and not necessarily mechanically. The terms "a" and "an" are defined as one or more unless stated otherwise.

The term "exemplary" is used herein to mean "serving as an example, instance, or illustration". Any embodiment described herein as "exemplary" is not necessarily to be construed as preferred or advantageous over other embodiments. Likewise, the term "embodiment" does not require that all embodiments of the invention include the discussed feature, advantage, or mode of operation.

Throughout this application, the terms "comprise" (and any form of comprise, such as "comprises" and "comprising"), "have" (and any form of have, such as "has" and "having"), "include", (and any form of include, such as "includes" and "including") and "contain" (and any form of contain, such as "contains" and will "containing") are used as open-ended linking verbs. It will be understood that these terms are meant to imply the inclusion of a stated element, integer, step, or group of elements, integers, or steps, but not the exclusion of any other element, integer, step, or group of elements, integers, or steps. As a result, a system, method, or apparatus that "comprises", "has", "includes", or "contains" one or more elements possesses those one or more elements but is not limited to possessing only those one or more elements. Similarly, a method or process that "comprises", "has", "includes" or "contains" one or more operations possesses those one or more operations but is not limited to possessing only those one or more operations.

Aspects of the invention are disclosed in the following description and related drawings directed to exemplary embodiments of the invention. Alternate embodiments may optionally be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

It should also be appreciated that the terms "firearm", "rifle", "optic", and "image offsetting apparatus" are used for basic explanation and understanding of the operation of the systems, methods, and apparatuses of the presently disclosed systems, methods, and/or apparatuses. Therefore, the terms "firearm", "rifle", "optic", and "image offsetting apparatus" are not to be construed as limiting the systems, methods, and apparatuses of the presently disclosed systems, methods, and/or apparatuses. For example, it should be appreciated that the term "optic" may include scopes, sights, holographic sights, red dot sights, reflex sights, and the like.

Figure 2:
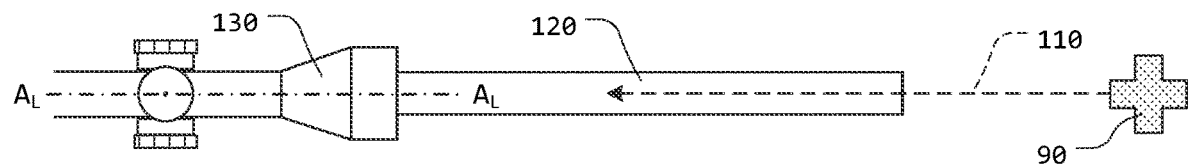
FIG. 2 illustrates a top view of an exemplary direct image pathway in its standard position before entering an existing optics device, wherein the direct image pathway is intercepted by the barrel and muzzle end obstructing line of sight to the optic.
Figure 3:
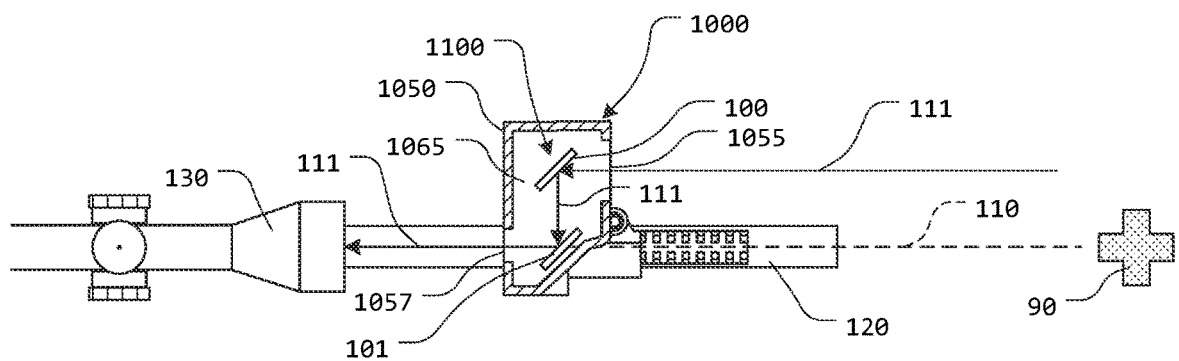
FIG. 3 illustrates a top view of an exemplary diagram of an image offsetting device and/or system, according to the present disclosure.
Figure 4:
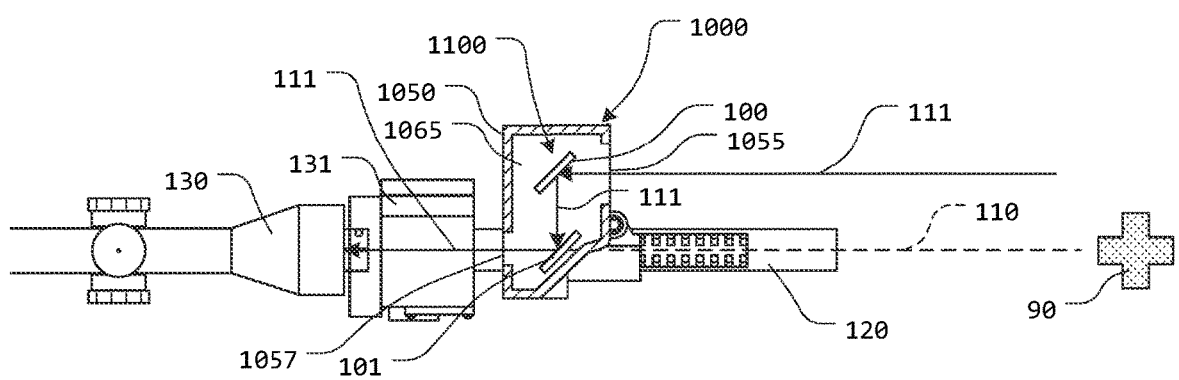
FIG. 4 illustrates a top view of an exemplary diagram of an image offsetting device and/or system, according to the present disclosure.
Figure 5:
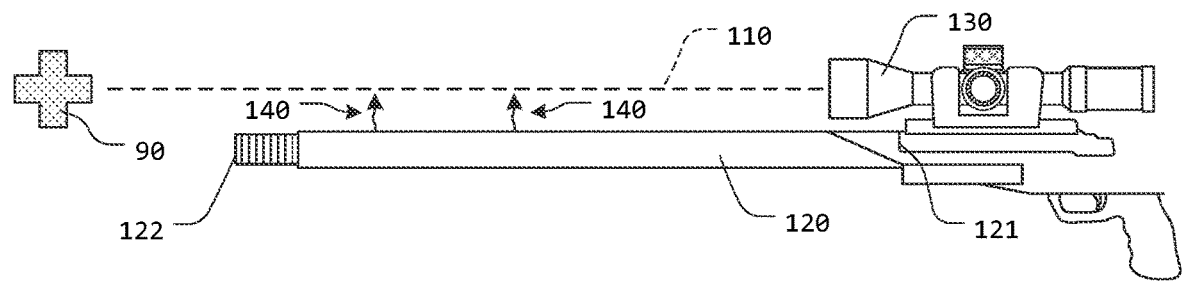
FIG. 5 illustrates a side view of a direct image pathway in its standard position before entering an existing optics device, wherein the direct image pathway is distorted by heat from the barrel or other forward mount accessory before reaching the optic.
Figure 6:
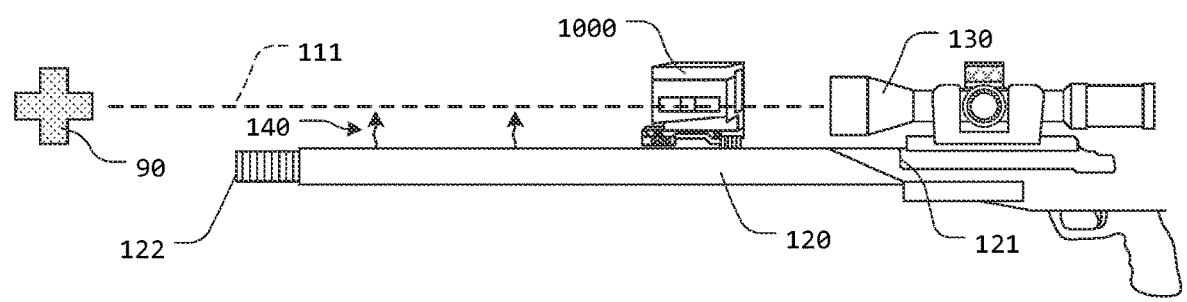
FIG. 6 illustrates an exemplary diagram of an image offsetting device and/or system, according to the present disclosure.

Turning now to the appended drawing figures, FIGS. 1, 2, and 5 illustrate certain elements associated with a known firearm, including a barrel 120 extending from a breech end 121 to a muzzle end 122, and an optical targeting device 130, while FIGS. 3-4 and 6-9 illustrate certain features and/or elements of an exemplary embodiment of an image offsetting apparatus 1000 attached or coupled to the exemplary firearm, according to the present disclosure.

As illustrated in FIGS. 1 and 2, the optical line of sight, or direct image pathway 110, from the optical targeting device 130 to the target object 90 may be blocked by one or more of the barrel 120 and the muzzle end 122. As illustrated, a direct image pathway 110 is shown in a standard position before entering an existing optical targeting device 130, such as a scope, reticle, or the like, or any other aiming device. As further illustrated, the direct image pathway 110 may be intercepted by the barrel 120 and muzzle end 122 obstructing line of sight of the direct image pathway 110 to the optical targeting device 130.

As illustrated in FIG. 5, an incoming, direct image pathway 110 is illustrated in a position before entering the optical targeting device 130. Here, the direct image pathway 110 is not blocked by the barrel 120 or the muzzle end 122, but the image of the target object 90, along the direct image pathway 110, is distorted by radiated heat 140 from the barrel 120 or from other forward mount accessories (not shown) before entering the optical targeting device 130. In either case, the optical line of sight, or direct image pathway 110, from the firearm optical targeting device 130 to the target object 90 is obstructed or distorted, before entering the optical targeting device 130, hampering or negating the capability to make an accurate shot with the firearm.

While various exemplary embodiments of the present disclosure are described as being utilized in conjunction with an optical targeting device 130, it should be appreciated that the image offsetting apparatus 1000 may be utilized with or without an optical targeting device 130. If utilized without the optical targeting device 130, the offset image pathway 111 of the target object 90 exits the outgoing image aperture 1057 and is directed directly to the user i.e., directed directly to one or both of the user's eye(s) 50.

FIGS. 3-4 and 6-9 illustrate certain features and/or elements of an exemplary embodiment of the image offsetting apparatus 1000 attached or coupled to the exemplary firearm. In various exemplary, nonlimiting embodiments, the image offsetting apparatus 1000 comprise a scope or other device that is attached, coupled, or mounted to the firearm, such as a rifle, that can allow a user to more accurately acquire, view, range, and shoot targets at extended ranges or through rapid deployment of the system.

In these exemplary embodiments, a direct image pathway 110 is illustrated, as well as an offset image pathway 111. The offset image pathway 111 is typically provided to one side or the other of the barrel 120. For example, if the direct image pathway 110 is provided at a 12 o'clock position relative to the barrel 120, as illustrated most clearly in FIG. 8, the offset image pathway 111 may be provided at a position between a 1 o'clock position in a 5 o'clock position or an 11 o'clock position and a 7 o'clock position relative to the barrel 120. In certain exemplary embodiments, the offset image pathway 111 may be provided at a position of either 9 o'clock or 3 o'clock, relative to the barrel 120, as illustrated most clearly in FIG. 9.

The reference to clock positions refers to a relative direction using the analogy of a 12-hour clock to describe angles and/or directions. As utilized herein, the clock face is provided in an upright or vertical orientation, such that a 12 o'clock position is (90°) upward from the barrel 120, the 6 o'clock position is (−90°) downward from the barrel 120, the 3 o'clock position is (0°) to the right of the barrel 120, and the 9 o'clock position is (180°) to the left of the barrel 120, when viewed from the rear.

In certain exemplary embodiments, as illustrated, the image offsetting apparatus 1000 comprises a mirror assembly 1100. In these exemplary embodiments, the mirror assembly 1100 comprises one or more first component mirror 100 and second component mirror 101. The first component mirror 100 and second component mirror 101 may be coupled with existing optical targeting device 130. Thus, when the direct image pathway 110 from target object 90 passes through the mirror assembly 1100, and the internal first component mirror 100 and second component mirror 101, and is presented to the optical targeting device 130, the barrel 120 does not intercept the offset image pathway 111 of target object 90 to optical targeting device 130.

In certain exemplary embodiments, as illustrated in FIG. 4, the image offsetting apparatus 1000 provides an offset image pathway 111 that is substantially parallel but offset from the direct image pathway 110. The mirror assembly 1100 may optionally be comprised of first component mirror 100 and second component mirror 101 and may be coupled with existing optical targeting devices 130 and other optical components 131. Thus, when the original image of the target object 90 passes through the mirror assembly 1100 and the internal first component mirror 100 and second component mirror 101, and optical accessory 131 to optical targeting device 130, the barrel 120 does not intercept the offset image pathway 111 of target object 90 to optical targeting device 130.

As illustrated, the image offsetting apparatus 1000 is utilized to produce an offset image pathway 111 and present the offset image pathway 111 to the optical targeting device 130. The mirror assembly 1100, comprising the first component mirror 100 and second component mirror 101 may be coupled with existing optical targeting devices 130. Thus, when the original image of the target object 90 passes through the mirror assembly 1100 and the internal first component mirror 100 and second component mirror 101, to optical targeting device 130, the radiated heat 140 from barrel 120 does not intercept the offset image pathway 111 from target object 90.

The direct image pathway 110 generally extends along the longitudinal axis, $A_L$, of the optical targeting device 130 and along the longitudinal axis, $A_L$, of the barrel 140. The longitudinal axis, $A_L$, of the optical targeting device 130 and the longitudinal axis, $A_L$, of the barrel 140 typically form a vertical plane, $P_V$.

The incoming image aperture 1055 is formed offset from the longitudinal axis, $A_L$, of the optical targeting device 130 and along the longitudinal axis, $A_L$, of the barrel 140. Thus, the offset image pathway 111 is at least partially offset from the longitudinal axis, $A_L$, of the optical targeting device 130, offset from the longitudinal axis, $A_L$, of the barrel 140, and offset from the vertical plane, $P_V$.

In certain exemplary embodiments, as illustrated, the offset image pathway 111 is substantially parallel to the direct image pathway 110. Alternatively, the offset image pathway 111 may intersect the direct image pathway 110.

Figure 7:
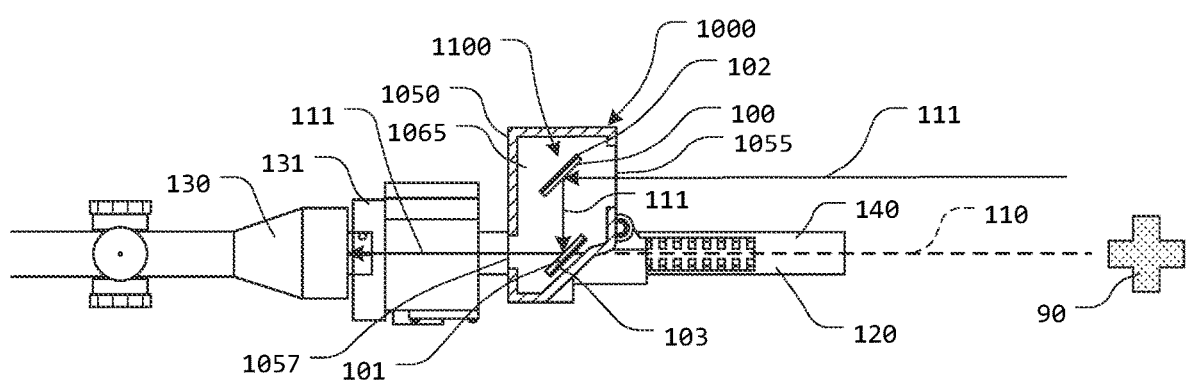
FIG. 7 illustrates a top view of an exemplary diagram of an image offsetting device and/or system, according to the present disclosure.

As illustrated, for example, in FIG. 7, the image offsetting apparatus 1000 provides an offset image pathway 111. The mirror assembly 1100 may be coupled with existing optical targeting device 130 and other optical components 131. Thus, when the original image of the target object 90 passes through the mirror assembly 1100, and optical accessory 131 to optical targeting device 130, the radiated heat 140 from barrel 120 does not intercept the offset image pathway 111 from target object 90.

The image offsetting apparatus 1000 may be such that, by implementing the image offsetting apparatus 1000, the effective range of the firearm, utilizing the image offsetting apparatus 1000 and the optical targeting device 130, may be substantially increased, for example about 200% or more.

The image offsetting apparatus 1000 described in exemplary embodiments herein may be such that the image offsetting apparatus 1000 presents an image of the target object 90 from an offset image pathway 111 to the optical targeting device 130. Thus, the image of the target object 90, as presented to the optical targeting device 130 is shifted from the direct image pathway 110, around the barrel 120 and the muzzle end 122, such that the barrel 120 and the muzzle end 122 and any thermal rise or radiated heat 140 do not block or distort the image presented to the optical targeting device 130.

The image offsetting apparatus 1000 is positioned so as to retain a parallel axis to the bore axis 105 of the barrel 120 and may be used or applied on or with respect to any shooting platform, or with respect to any rail or mounts. Furthermore, the image offsetting apparatus 1000 may be utilized without additional tools or without negatively impacting or adjusting the optical targeting device 130.

The image offsetting apparatus 1000 shifts the optical path presented to the optical targeting device 130 from the axis that can be intercepted by the barrel 120 or any forward mount accessory 122 and/or the radiated heat 140 from the barrel 120 or other forward mount accessory 122 to an axis parallel to the bore axis 105 of the barrel 120 where the barrel 120 cannot obstruct the pathway from the target object 90 to the optical targeting device 130.

The image offsetting apparatus 1000 may be used to shift the incoming image's optical path around the barrel 120 before reaching the optical targeting device 130. This optical shift around the barrel 120 may take place on any plane around the barrel 120 in either, or both of, x and y axes.

It should be appreciated that, in various exemplary embodiments, the image offsetting apparatus 1000 may optionally be an independent or standalone device. Alternatively, the image offsetting apparatus 1000 may optionally be integrated into other optical components and attached or coupled to any rail or mount or to any existing image offsetting apparatus or optic, such as a scope or other such device.

In one exemplary embodiment, the image offsetting apparatus 1000 may be utilized with a 7-35×56 mm optical targeting device 130. It should be appreciated, however, that other variations may be utilized or implemented. In this example, the optical targeting device 130 may have an adjustment capability of about 30 MIL of angle. It may further be appreciated that although MIL may be used in exemplary embodiments herein, the same principals, devices, methods and techniques may be used with respect to minutes of angle (MOA) and they may be adjusted in any desired increments, for example 20 MOA, 25 MOA, 150 MOA, and so forth. In the example, different sight-in techniques may be utilized. For example, a 100 meter zero may be obtained and the elevation turrets of the optical targeting device 130 may be utilized to their standard limits example 30 MIL. In this example the 30 MIL could allow a 2200 m shot with a typical high performance round. Utilizing specialized optics, bases, rings, rails, or the like, to add an additional 100 MIL, accurate sighting could be made for up +3000 yds using a desired ammunition, such as 0.375CheyTac. In this example, the image offsetting apparatus 1000 may be utilized on a rifle with a barrel 120 and muzzle end 122 measuring 36 inches and 4 inches, respectively. In this example, the barrel 120 and muzzle end 122 obstruct the direct image pathway 110 between a target object 90 and the optical targeting device 130, negating the capability to make a long range shot. In still another exemplary embodiment, the image offsetting apparatus 1000 shifts the optical pathway between the target object 90 and the optical targeting device 130 from the direct image pathway 110 to the offset image pathway 111, which is taken along the side of the barrel 120.

In another exemplary embodiment, a tactical rifle such as an AR-10/15 rifle with a holographic sight, or the like, and a suppressor may be utilized. In this exemplary embodiment, the image offsetting apparatus 1000 shifts the optical pathway between the target object 90 and the optical targeting device 130 from the direct image pathway 110 to the offset image pathway 111, which is taken along the side of the barrel 120, away from the direct path of the radiated heat 140 of the hot barrel and suppressor emitting a thermal mirage, from the radiated heat 140, allowing for accurate sighting and targeting up to 600 yds, significantly improving the capability to sight on the target object 90. Still other scopes and weapons could have a range far greater than the example provided.

In certain exemplary, nonlimiting embodiments, systems, methods, and apparatuses for horizontally offsetting an image pathway from the direct image pathway 110 for an optical targeting device 130 are provided. The methods may include providing an image offsetting apparatus 1000 comprising a mirror assembly 1100 having two or more first component mirror 100 and second component mirror 101 and/or lenses offset between a target object 90 and an optical targeting device 130. The mirrored image offsetting apparatus 1000 may be utilized to relay a horizontally offset target image, which is then viewed through the optical targeting device 130.

In certain exemplary, nonlimiting embodiments, an image offsetting apparatus 1000 for producing an offset image is provided. The mirrored optical offsetting image apparatus, or image offsetting apparatus 1000, may include an optic having a zero and set magnification range. The image offsetting apparatus 1000 may further include an optical adjustment mirror/lens assembly that is removably disposed in a line of sight between a target object 90 and the optical targeting device 130 and/or its reticle/aim point. The image offsetting apparatus 1000 may relay a horizontally offset target image before the target image reaches the optical targeting device 130 and/or the aim point of the optical targeting device 130.

In various exemplary, nonlimiting embodiments, the image offsetting apparatus 1000 comprises at least some of a housing 1050 having an optical cavity 1065 defined at least partially within the housing 1050. The optical cavity 1065 extends from an incoming image aperture 1055 to an outgoing image aperture 1057. Two or more adjustable mirror holders, each having an attached or coupled component mirror, each component mirror having a reflective surface, are positioned parallel to each other within the optical cavity 1065.

While the housing 1050 is illustrated as having a one-piece body, it should be appreciated that the body of the housing 1050 can be constructed of separate, upper and/or lower portions or plates, front and/or rear portions or plates, or any combination of integral and/or separate portions to form the housing 1050 for protecting, securing, or holding the optical systems of the present disclosure.

The adjustable mirror holders 102 and 103, respectively, secure and adjust the reflective surfaces of the first component mirror 100 and second component mirror 101, such that an image entering the incoming image aperture 1055 can be reflected off the reflective surfaces of the component mirrors, so as to exit the outgoing image aperture 1057 at a determined offset that is horizontally offset and parallel or near parallel to the direct image pathway 110.

In various exemplary embodiments, an adjustment knob 104 is attached or coupled to the adjustable mirror holder 102 and an adjustment knob 107 is attached or coupled to the adjustable mirror holder 103. Rotational movement of the adjustment knob 104 and/or 107 results in rotational movement of the first component mirror 100 and second component mirror 101, respectively.

Typically, rotational movement or adjustment of one of the component mirrors (100 or 101) will adjust a vertical (up and down) component of, for example, an offset image pathway 111, while rotational movement or adjustment of the other of the component mirrors (100 or 101) will adjust a horizontal (left and right) component of, for example, an offset image pathway 111. The adjustment knob 104 and/or 107 are typically separate for ease of adjustment, but a single adjusting surface could accomplish both vertical and horizontal adjustments.

In various exemplary, nonlimiting embodiments, the image offsetting apparatus 1000 includes a housing 1050 having an optical cavity 1065 defined at least partially within the housing 1050, wherein the optical cavity 1065 extends from an incoming image aperture 1055 to an outgoing image aperture 1057 and at least one adjustable mirror holder 102 or 103 positioned within at least a portion of the optical cavity 1065, wherein at least a portion of the at least one adjustable mirror holder 102 or 103 includes a component mirror having a reflective surface attached or coupled thereto, and wherein adjustment of the adjustable mirror holder 102 or 103 through axial rotation, set screws, or, without limitation or restriction, other means, adjusts the reflective surface of the component mirror such that an image entering the incoming image aperture 1055 can be reflected off of the reflective surface, so as to exit the outgoing image aperture 1057 at a determined offset that is horizontally offset and parallel or near parallel to the direct image pathway 110.

In various exemplary embodiments, the at least one adjustable mirror holder 102 or 103 is adjustable in an x or y axis.

In certain exemplary, nonlimiting embodiments, the image offsetting apparatus 1000 includes a housing 1050 having an optical cavity 1065 defined at least partially within the housing 1050, wherein the optical cavity 1065 extends from an incoming image aperture 1055 to an outgoing image aperture 1057 and two or more adjustable mirror holders positioned within at least a portion of the optical cavity 1065, wherein at least a portion of each of the adjustable mirror holders includes a component mirror having a reflective surface attached or coupled thereto, and wherein adjustment of the adjustable mirror holders through axial rotation, set screws, or, without limitation or restriction, other means, independently adjusts the reflective surface of each component mirror such that an image entering the incoming image aperture 1055 can be reflected off of the reflective surfaces of the component mirrors, so as to exit the outgoing image aperture 1057 at a determined offset that is horizontally offset and parallel or near parallel the direct image pathway 110.

In various exemplary embodiments, the at least one adjustable mirror holder 102 or 103 is adjustable in an x or y axis.

In certain exemplary embodiments, the reflective surface or surfaces is/are a reflective surface element attached or coupled to the at least one adjustable mirror holder 102 or 103.

In certain exemplary embodiments, two or more adjustable mirror holders are included, each having an associated reflective surface or reflective surface element.

In various exemplary, nonlimiting embodiments, the image offsetting apparatus 1000 of the present disclosure comprises at least some of a housing 1050 having an optical cavity 1065 defined at least partially within the housing 1050, wherein the optical cavity 1065 extends from an incoming image aperture 1055 to an outgoing image aperture 1057; at least one first component mirror positioned within at least a portion of the optical cavity 1065, wherein at least a portion of the at least one first mirror holder includes a component mirror having a reflective surface attached or coupled thereto, wherein the at least one first mirror holder can be at least partially rotated through axial rotation, set screws, or, without limitation or restriction, other means; and at least one second component mirror positioned within at least a portion of the optical cavity 1065, wherein at least a portion of the at least one second component mirror includes a component mirror having a reflective surface attached or coupled thereto, wherein the at least one second mirror holder can be at least partially rotated through axial rotation, set screws, or, without limitation or restriction, other means; wherein the reflective surface of the at least one first component mirror is positioned so as to receive an target image through the incoming image aperture 1055 and reflect the target image to the reflective surface of the at least one second component mirror, and wherein the reflective surface of the at least one second component mirror is positioned so as to receive the target image from the reflective surface of the at least one first component mirror and reflect the target image through the outgoing image aperture 1057; and wherein adjustment of the at least one first component mirror and/or the at least one second component mirror adjusts an angle at which the target image is reflected through the outgoing image aperture 1057 to make the alternate image pathway horizontally offset and parallel or near parallel to the direct image pathway 110.

In various exemplary embodiments, the at least one adjustable mirror holder 102 or 103 is adjustable in an x or y axis.

In various exemplary, nonlimiting embodiments, the reflective surface of the at least one first component mirror and/or the reflective surface of the at least one second component mirror is a polished or coated portion, a concave surface, or a convex surface of the at least one first component mirror and/or the reflective surface of the at least one second component mirror.

In various exemplary, nonlimiting embodiments, the reflective surface of the at least one first component mirror and/or the reflective surface of the at least one second component mirror is a plane mirror or a magnifying mirror attached or coupled to the at least one adjustable mirror holder 102 or 103.

In various exemplary, nonlimiting embodiments, a determined adjustment of the at least one first component mirror and/or a determined adjustment of the at least one second component mirror adjusts an angle at which the target image is reflected through the outgoing image aperture 1057 at a determined offset that is parallel or near parallel and horizontally offset to the direct image pathway 110.

In various exemplary, nonlimiting embodiments, the image offsetting systems, methods, and apparatuses of the present disclosure comprises at least some of a housing 1050 having an optical cavity 1065 defined at least partially within the housing 1050, wherein the optical cavity 1065 extends from an incoming image aperture 1055 to an outgoing image aperture 1057; and one or more adjustable mirror holders 102 and/or 103, wherein each adjustable mirror holder 102 or 103 is positioned within at least a portion of the optical cavity 1065, wherein at least a portion of each of the adjustable mirror holders 102 and/or 103 includes a component mirror having a reflective surface attached or coupled thereto, and wherein adjustment of at least one of the adjustable mirror holders 102 and/or 103 adjusts the reflective surfaces such that a target image entering the incoming image aperture 1055 is reflected by the reflective surfaces, so as to exit the outgoing image aperture 1057 at a determined offset that is parallel or near parallel and horizontally offset to the direct image pathway 110.

In certain exemplary, nonlimiting embodiments, certain of the elements of the image offsetting apparatus 1000, such as, for example, the mirror assembly 1100, the component mirrors 100 and/or 101, and/or the adjustable mirror holders 102 and/or 103 are adjustable for calibration of the image offsetting apparatus 1000. Once adjusted, certain or each of these elements may be fixed for an exact pre-prescribed horizontal shift of the offset image pathway 111. These elements may be fixed by a mechanical element, various glues, adhesives, or the like, to prevent or discourage movement of the elements from their fixed or desired position.

In various exemplary, nonlimiting embodiments of the method, the reflective surface of the at least one first component mirror and/or the reflective surface of the at least one second component mirror is a plane mirror attached or coupled to the at least one adjustable mirror holder 102 or 103.

The presently disclosed systems, methods, and/or apparatuses separately and optionally provide image offsetting systems, methods, and/or apparatuses that allow a user to swap or replace devices with different mirrors/lenses and/or capabilities.

It should also be appreciated that the terms "image offsetting", "adjustable mirror holder", "mirror", and "firearm" are used for basic explanation and understanding of the operation of the systems, methods, and/or apparatuses of the presently disclosed systems, methods, and/or apparatuses. Therefore, the terms "image offsetting", "adjustable mirror holder", "mirror", and "firearm" are not to be construed as limiting the systems, methods, and/or apparatuses of the presently disclosed systems, methods, and/or apparatuses.

For simplicity and clarification, the visual image offsetting systems, methods, and/or apparatuses of the presently disclosed systems, methods, and/or apparatuses will be described as being used in conjunction with a firearm, such as a rifle or carbine. However, it should be appreciated that these are merely exemplary embodiments of the image offsetting systems, methods, and/or apparatuses and are not to be construed as limiting the presently disclosed systems, methods, and/or apparatuses. Thus, the image offsetting systems, methods, and/or apparatuses of the presently disclosed systems, methods, and/or apparatuses may be utilized in conjunction with any object or device.

In various exemplary embodiments, various components of the image offsetting apparatus 1000 are substantially rigid and are formed of steel. Alternate materials of construction of the various components of the image offsetting apparatus 1000 may include one or more of the following: stainless steel, aluminum, titanium, polytetrafluoroethylene, and/or other metals, as well as various alloys and composites thereof, glass-hardened polymers, polymeric composites, polymer or fiber reinforced metals, carbon fiber or glass fiber composites, continuous fibers in combination with thermoset and thermoplastic resins, chopped glass or carbon fibers used for injection molding compounds, laminate glass or carbon fiber, epoxy laminates, woven glass fiber laminates, impregnate fibers, polyester resins, epoxy resins, phenolic resins, polyimide resins, cyanate resins, high-strength plastics, nylon, glass, or polymer fiber reinforced plastics, thermoform and/or thermoset materials, and/or various combinations of the foregoing. Thus, it should be understood that the material or materials used to form the various components of the image offsetting apparatus 1000 is a design choice based on the desired appearance and functionality of the image offsetting apparatus 1000.

It should be appreciated that certain elements of the image offsetting apparatus 1000 may be formed as an integral unit. Alternatively, suitable materials can be used and sections or elements made independently and attached or coupled together, such as by adhesives, welding, screws, rivets, pins, or other fasteners, to form the various elements of the image offsetting apparatus 1000.

It should also be understood that the overall size and shape of the image offsetting apparatus 1000, and the various portions thereof, is a design choice based upon the desired functionality and/or appearance of the image offsetting apparatus 1000.

The above weapons, scopes, magnifications, ranges, and adjustments by the optical magnification device in the above applications are for exemplary purposes and it may be understood by a person having ordinary skill in the art that a variety of weapons, scopes, magnifications, ranges, and adjustments may be utilized and achieved.

It should be appreciated that the component mirrors and lens may be any type of mirror and lens, for example glass, plastic, crystal, fused silica, sapphire, reflective or polished metals, silicon or any other material hard durable surface.

In various exemplary, nonlimiting embodiments, an optical lens or other device may optionally be used at either or both of the incoming aperture 1055 and/or the outgoing aperture 1057 to increase or decrease the apparent offset in x and/or y axis to purposely further offset or correct the offset image pathway 111 so that the offset image pathway 111 is more parallel to the direct image pathway 110. Thus, for example, if an image, after offset, is 2 MOA high and 3 MOA to the right, a lens could be positioned to negate the extra (perhaps unwanted) offset for ballistic compensation. The optical lens or other device could optionally be utilized to correct internal error within the offsetting apparatus 1000 or induce an "error" for a determined, set value.

The image offsetting apparatus 1000 may be employed in visible spectrum optics, low light level devices (night optics), filtration, and other enhanced image devices.

Using the image offsetting apparatus 1000 may create a greater and/or more precise operating range that could be applied to a larger variety of optical targeting devices 130. Such optical targeting device 130 can include, but are not limited to, scopes, night vision optics, ACOGs, holographic devices, red dots, lasers, targeting devices, iron sights, mechanical devices, and the like. The image offsetting apparatus 1000 can further be applied in layers and/or steps that can allow for stepped optical shift changes (i.e. vertically and/or horizontally). For example, the image offsetting apparatus 1000 may be adjusted to provide small variations, as desired by a user, to improve sighting or targeting. Such adjustments may allow for the adjusting of the zero of a rifle or reticle in any horizontal (x) or vertical (y) direction, or any combination thereof. It may further be appreciated that the zero of a rifle or optical system can be adjusted in any desired various increments by changing the tilt/slant/angle or elevation of the mirrors and lenses and in turn the horizontally offset image in the exemplary embodiments described herein. Such additions or subtractions may be made manually or automatically. For example, some exemplary embodiments may allow a person to use the image offsetting apparatus 1000 as purchased, or use a machined key, turret, or fully electronic and ballistically driven assembly to create adjustable secondary zeroes.

It can be further appreciated that typical lenses transmit object/target image errors at a value that coincides with the glass optical index. In a typical case a typical lens will only transmit 50% of an error introduced by the lens. Mirrors 100, 101 as used in our device transmit an error at a factor of 2×. It may be appreciated that the image offsetting apparatus 1000, in total, could contain 2 or more mirrors/reflective bodies 100, 101, thereby introducing errors of 4× or more from the original introduced error. It may be further appreciated that the image offsetting apparatus 1000 must be capable of working within image errors of a total of less than single digit arc seconds though this is not to limit the design, functionality, and performance of image offsetting apparatus 1000.

Figure 10:
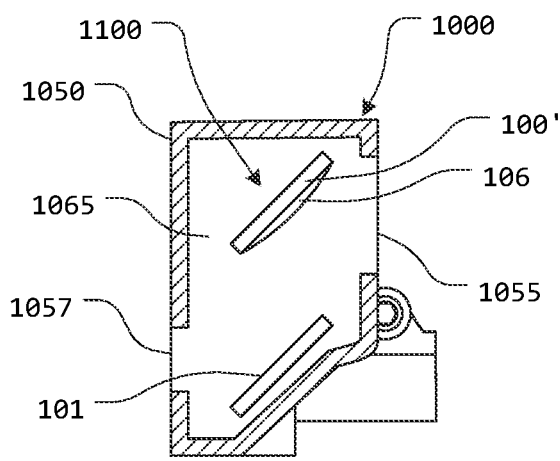
FIG. 10 illustrates a top view of an exemplary embodiment of an image offsetting device and/or system, according to the present disclosure.
Figure 11:
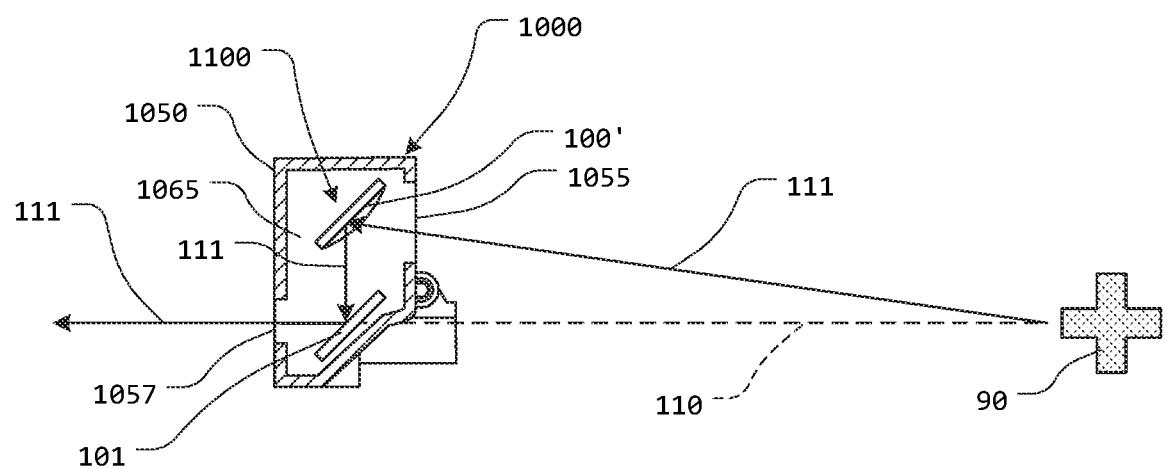
FIG. 11 illustrates a top view of an exemplary embodiment of an image offsetting device and/or system, according to the present disclosure.

In various exemplary embodiments, as illustrated in FIGS. 10 and 11, at least one of the mirrors/reflective bodies 100 and/or 101 is replaced by a compound mirror/reflective body 100'. For example, the mirror/reflective body 100' may optionally comprise a combination of a mirror or reflective surface and a lens 106. By utilizing a combination of a mirror or reflective surface and a lens 106, the offset image of the offset image pathway 111 can be magnified or de-magnified. In certain exemplary embodiments, the lens 106 can be formed of an extended or radiused portion of the mirror/reflective body 100'. The radiused portion can be integrally formed or built directly on or attached to the mirror/reflective body 100' or can be a separate or discrete, stand-alone lens used within the image offsetting apparatus 1000. It should be appreciated that the mirror/reflective body 100' may be utilized to replace the mirror/reflective body 100 and/or the mirror/reflective body 101. Alternatively, the lens 106 may optionally be applied to either surface of a prism body or be placed in the entry opening 1055 or exit opening 1057. The positions noted are representative but not totally inclusive all positions a magnification system could be placed using the noted image offsetting apparatus 1000.

Figure 12:
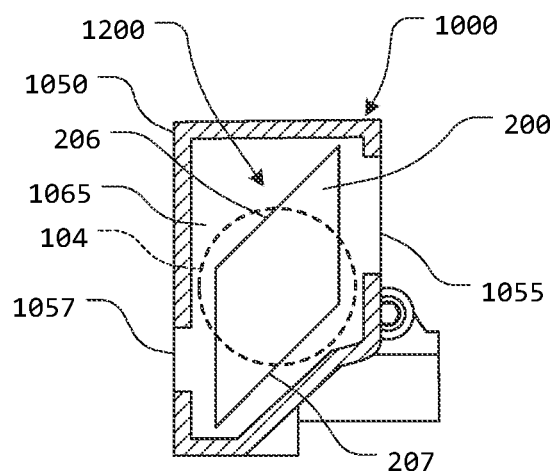
FIG. 12 illustrates a top view of an exemplary embodiment of an image offsetting device and/or system, according to the present disclosure.
Figure 13:
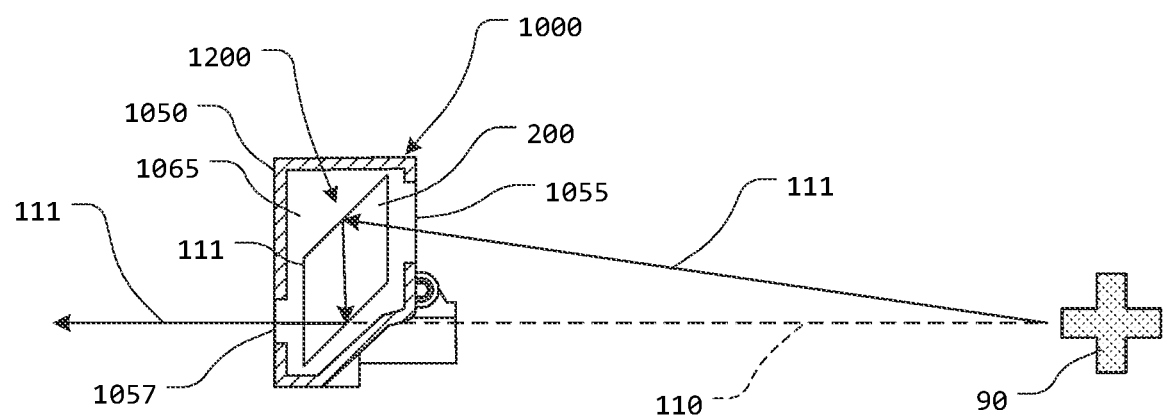
FIG. 13 illustrates a top view of an exemplary embodiment of an image offsetting device and/or system, according to the present disclosure.

As illustrated in FIGS. 12 and 13, the mirror assembly 1100 may optionally be replaced by a prism element 1200. In various exemplary embodiments, the prism element 1200 is formed of a single portion of a transparent material 200. Alternatively, the prism element 1200 is formed of 2 or more portions or wedges of transparent material attached, coupled, or aligned to form the prism element 1200.

Figure 14:
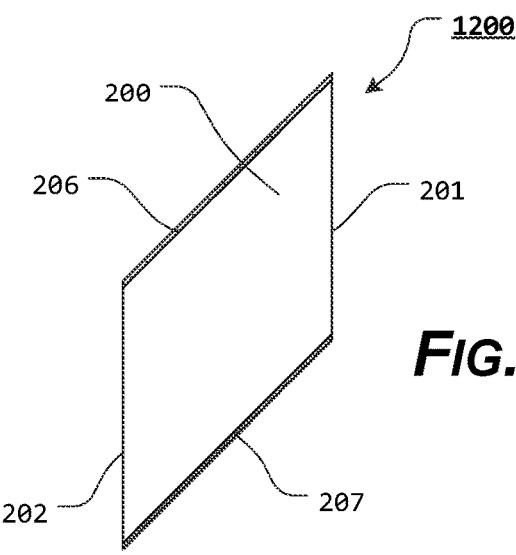
FIG. 14 illustrates a top view of an exemplary prism element, according to the present disclosure.
Figure 15:
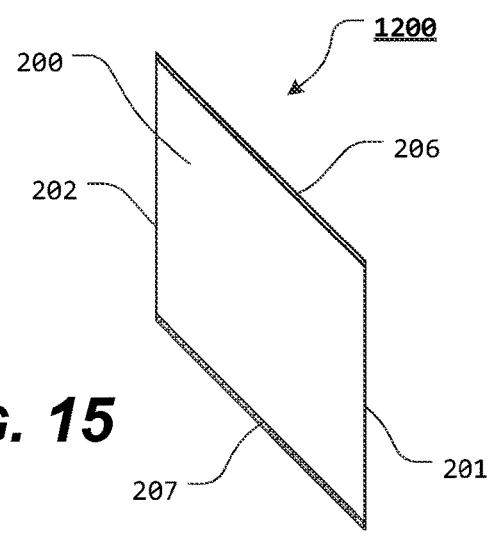
FIG. 15 illustrates a bottom view of an exemplary prism element, according to the present disclosure.
Figure 16:
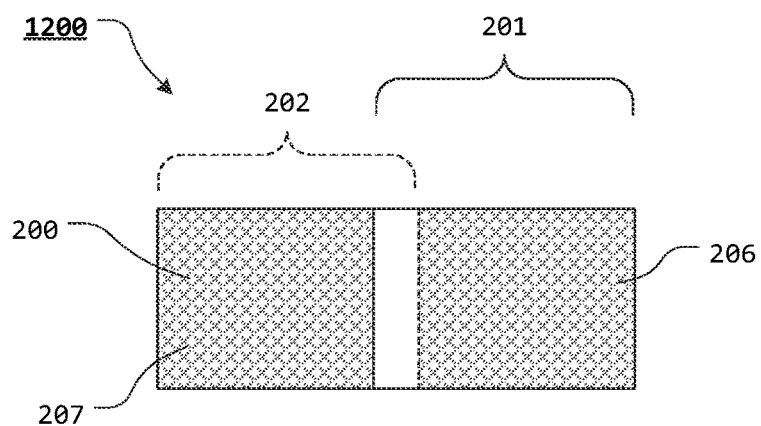
FIG. 16 illustrates a front view of an exemplary prism element, according to the present disclosure.

As illustrated in greater detail in FIGS. 14-16, the prism element 1200 is optionally formed of a single portion of transparent material 200, having a front face 201 and a rear face 202. The prism element 1200 utilizes internal reflection, a first internal refracting face 206 and a second internal refracting face 207, and/or a first mirrored reflective surface 206 and a second mirrored reflective surface 207 to allow the offset image pathway 111 of the target object 90 to enter the optical cavity 1065 through the incoming image aperture 1055 and enter the prism element 1200. The offset image pathway 111 of the target object 90 is then internally reflected within the prism element 1200 and exits the prism element 1200. When the offset image pathway 111 of the target object 90 exits the prism element 1200, the offset image pathway 111 of the target object 90 then exits the outgoing image aperture 1057.

In various exemplary embodiments, the prism element 1200 is attached or coupled within the optical cavity 1065, via a single supporting rod 104. Rotational movement of the supporting rod 104 results in rotational movement of the prism element 1200. Thus, if adjustment of the prism element 1200 is needed, rotational movement of the supporting rod 104 provides such adjustment.

While the supporting rod(s) 104 are shown as comprising a substantially round rod type devices, it should be appreciated that mounting surfaces can be utilized in conjunction with supporting rod(s) 104 having substantially rectangular or any other shape capable of holding the prism element 1200. It should also be appreciated that while the term rods and rotation are used further methods of manipulation can be employed.

In various exemplary embodiments, the prism element 1200 is positioned within the optical cavity 1065 such that the adjustment knob 104 is attached or coupled to the prism element 1200 and the adjustment knob 107 is attached or coupled to the prism element 1200. Rotational movement of the adjustment knob 104 and/or 107 results in horizontal or vertical rotational movement of the prism element 1200.

Figure 17:
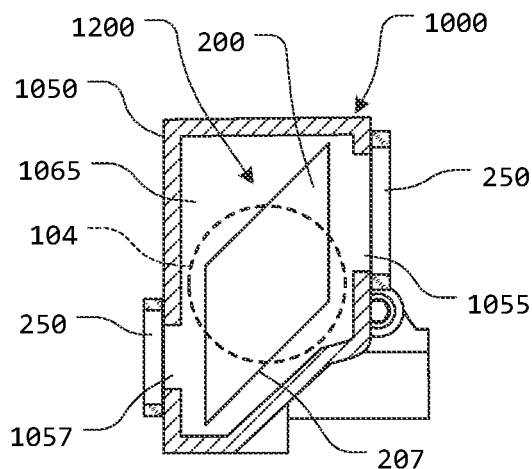
FIG. 17 illustrates a top view of an exemplary embodiment of an image offsetting device and/or system, according to the present disclosure.

As illustrated in FIG. 17, one or more lenses 250 may optionally be positioned to cover at least a portion of the incoming image aperture 1055 and/or the outgoing image aperture 1057. The one or more lenses 250 are aligned with the prism element 1200.

In various exemplary embodiments, each of the one or more lenses 250 may comprise a protective, color corrective, polarized, UV blocking, or other lens that alters or adjusts the offset image pathway 111 and/or the target object 90 before/as it enters the incoming image aperture 1050 or after/as it exits the outgoing image aperture 1057.

In various exemplary embodiments, each of the lenses 250 is optionally formed of a singular index material or of a multi-index chromatic correcting and image correcting materials as required to direct the offset image pathway 111.

In certain exemplary embodiments, one or more of the lenses 250 may optionally comprise an optical wedge, wedge assembly, or offset lens assembly. This allows further manufacturing methods and assembly methods for production of the lenses 250. Each of the lenses 250 may optionally be formed of a single prism, multi index prisms, or offset curved lenses to not only offset and alter the offset image pathway 111 position but to also add or subtract magnification. Lens 250 can be a singular index materials or multi-index chromatic correcting and image correcting materials as such required to direct the offset image pathway 111 per requirements.

In various exemplary embodiments, the optical wedge or wedge assemblies utilized in one or more of the lenses 250 are produced utilizing methods as described in U.S. Pat. No. 10,444,525 to Baker, entitled Methods for Producing an Optical Wedge or Prism Assembly.

It should be appreciated that one or more lenses 250 may optionally be placed at any point along the offset image pathway 111 in order to correct or intentionally offset the object image using some known angular value.

During use, as the offset image pathway 111 of the target object 90 enters the incoming image aperture 1055, the offset image pathway 111 passes through the front face 201 and enters the prism element 1200. The offset image pathway 111 is then reflected or refracted from the first reflective surface/refracting face 206, toward the second reflective surface/refracting face 207. When the offset image pathway 111 reaches the second reflective surface/refracting face 207, the offset image pathway 111 is reflected or refracted from the second reflective surface/refracting face 207, through the rear face 202, and exits the outgoing image aperture 1057 toward the optical targeting device 130 and/or the user's eye(s) 50.

Figure 18:
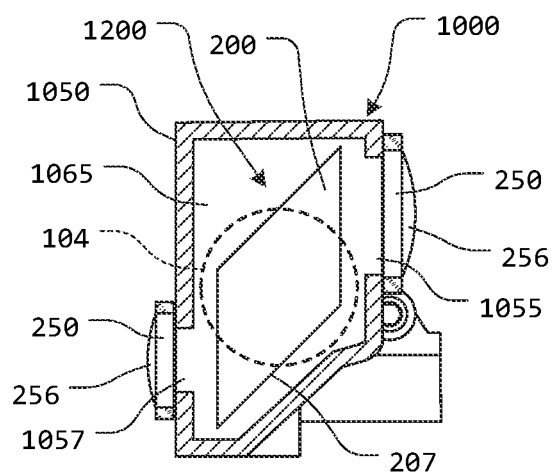
FIG. 18 illustrates a top view of an exemplary embodiment of an image offsetting device and/or system, according to the present disclosure.

As illustrated in FIG. 18, one or more optical lenses 256 may optionally be positioned to cover at least a portion of each of the lenses 250 and/or the incoming image aperture 1055 and/or the outgoing image aperture 1057. The one or more optical lenses 256 are aligned with the prism element 1200.

In various exemplary embodiments, each of the one or more optical lenses 256 may comprise a protective, color corrective, polarized, UV blocking, or other lens that alters or adjusts the offset image pathway 111 and/or the target object 90 before/as it enters the incoming image aperture 1050 or after/as it exits the outgoing image aperture 1057. Each of the optical lenses 256 may optionally be a substantially coplanar, bioconvex, plano-convex, positive meniscus, negative meniscus, plano-concave, bioconcave, or other lens.

In certain exemplary, nonlimiting embodiments, each of the optical lenses 256 may optionally be formed of a single prism, multi index prisms, or offset curved lenses to not only offset and alter the offset image pathway 111 position but to also add or subtract magnification. Each of the optical lenses 256 may optionally be a singular index materials or multi-index chromatic correcting and image correcting materials as such required to direct the offset image pathway 111 per requirements.

It should be appreciated that while the one or more lenses 250 and/or one or more optical lenses 256 are illustrated and described as being utilized in conjunction with the prism element 1200, the present disclosure is not so limited. For example, the one or more lenses 250 and/or one or more optical lenses 256 may optionally be utilized in conjunction with the various embodiments of the mirror assembly 1100, as illustrated in FIGS. 3-4 and 7-11.

Figure 19:
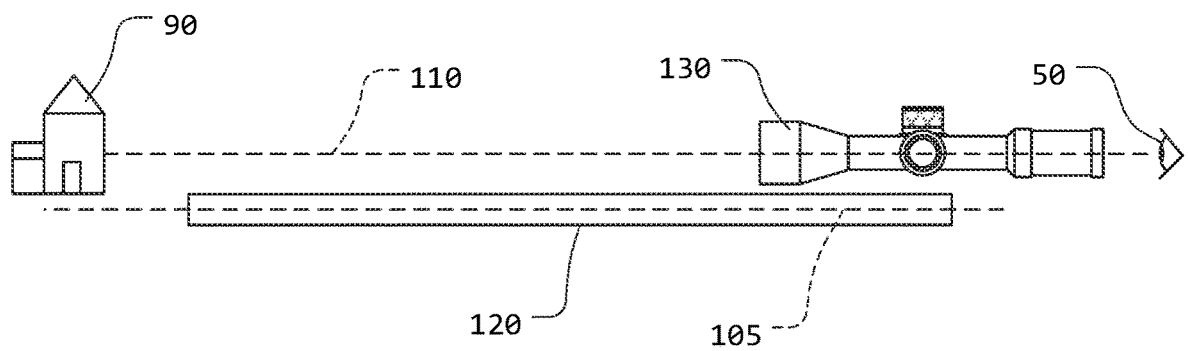
FIG. 19 illustrates a side view of an exemplary direct image pathway in its standard position before entering an existing optical targeting device.
Figure 20:
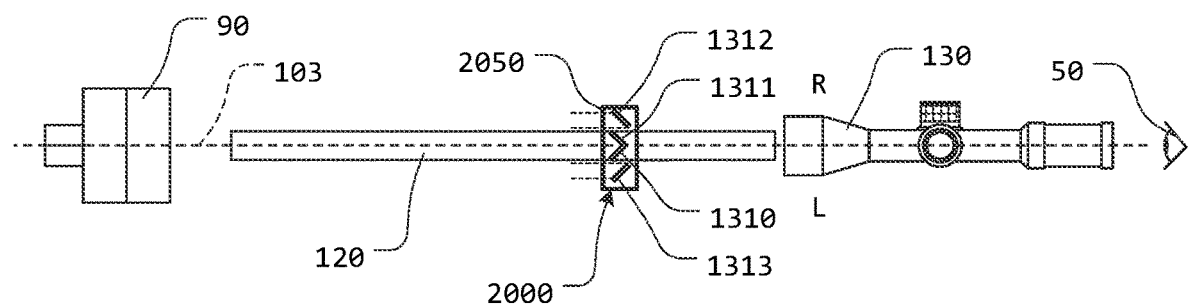
FIG. 20 illustrates a top view of certain exemplary components of an exemplary embodiment of an image offsetting device and/or system illustrated in conjunction with certain exemplary ancillary components, according to the present disclosure.
Figure 21:
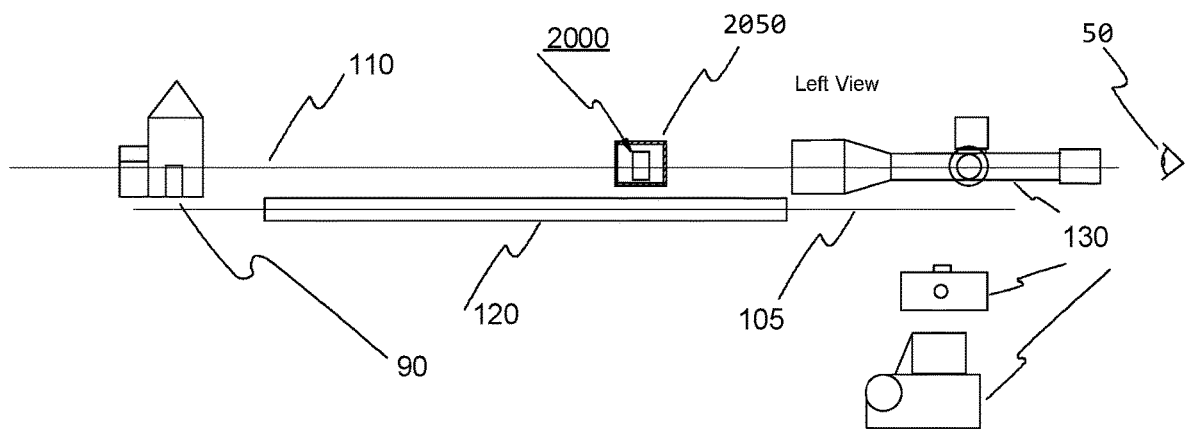
FIG. 21 illustrates a side view of certain exemplary components of an exemplary embodiment of an image offsetting device and/or system illustrated in conjunction with certain exemplary ancillary components, according to the present disclosure.
Figure 22:
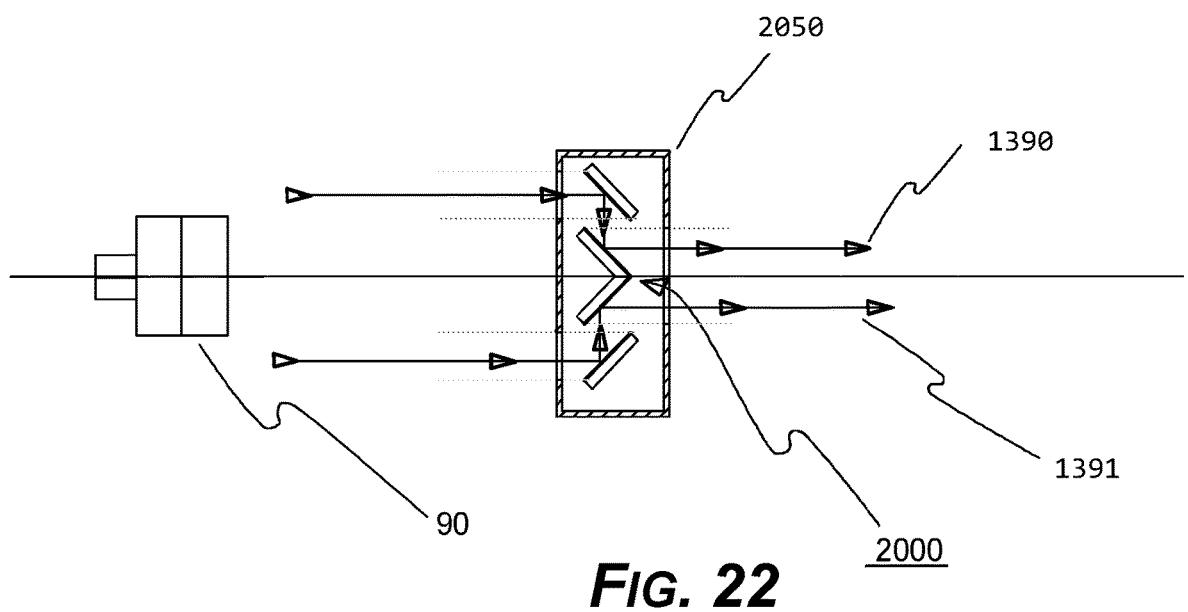
FIG. 22 illustrates a top view of certain exemplary components of an exemplary embodiment of an image offsetting device and/or system illustrated in conjunction with certain exemplary ancillary components, according to the present disclosure.
Figure 23:
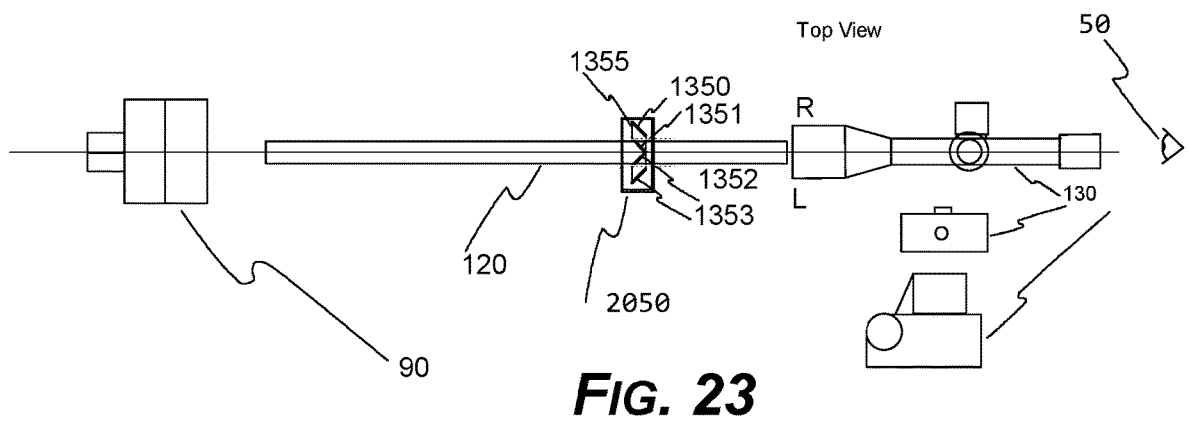
FIG. 23 illustrates a top view of certain exemplary components of an exemplary embodiment of an image offsetting device and/or system illustrated in conjunction with certain exemplary ancillary components, according to the present disclosure.

FIGS. 20-32 illustrate certain additional and/or alternative embodiments of the present disclosure. FIG. 19 illustrates a side view of an exemplary direct image pathway 110 from a target object 90, in its standard position before entering an existing optical targeting device 130 and then being presented to a user's eye(s) 50. The optical targeting device 130 represents an optical targeting device or primary optic. In various exemplary embodiments, the optical targeting device 130 may comprise, for example, a scope, a red dot, a Holographic device, a prism, or any device used to create a primary aim point. As illustrated, barrel 120 and bore axis 105 of the barrel 120 are substantially parallel to the direct image pathway 110. The bore axis 105 of the barrel 120 is typically below the direct image pathway 110.

The image offsetting apparatuses 2000 is used to create two, horizontal image pathways, i.e., for example, a right image pathway and a left image pathway that are provided to an optical targeting device 130. Alternatively, the image offsetting apparatus 2100 is used to create two, vertical image pathways, i.e., for example, an upper image pathway and a lower image pathway that are provided to an optical targeting device 130.

As illustrated, the image offsetting apparatus 2000 is positioned within the direct image pathway 110, between the target object 90 and the optical targeting device 130. It should be appreciated that the positioning of the image offsetting apparatus 2000 is similar to the positioning of the image offsetting apparatus 1000, as illustrated and described herein.

Two images of the target object 90 enter the image offsetting apparatus 2000, one image enters the image offsetting apparatus 2000 along a first offset image pathway 1390 and the other image enters the image offsetting apparatus 2000 along a second offset image pathway 1391. The images of the target object 90 are shifted, within the image offsetting apparatus 2000, to two new, apparent positions. The new images are then presented, along the first offset image pathway 1390 and the second offset image pathway 1391, to the optical targeting device 130. The first offset image pathway 1390 and the second offset image pathway 1391 travel through the optical targeting device 130 and are presented to the user's eye(s) 50.

In various exemplary, nonlimiting embodiments, the image offsetting apparatus 2000 comprises at least some of a housing 2050 having an optical cavity 2065 defined at least partially within the housing 2050. The optical cavity 2065 includes a first incoming image aperture 2055 and a second incoming image aperture 2056 are formed through portions of a front side of the housing 2050. An outgoing image aperture 2057 is formed through a portion of the rear side of the housing 2050. Two or more adjustable mirror holders, each having an attached or coupled component mirror, each component mirror having a reflective surface, are positioned within the optical cavity 2065.

It should also be appreciated that while the image offsetting apparatus 2000 is shown and described as including the first reflective surface 1310, the second reflective surface 1311, the third reflective surface 1312, and/or the fourth reflective surface 1313, the systems and methods of the present disclosure are operable with as few as two reflective surfaces and the inclusion of 4 reflective surfaces is not required, but is merely illustrative.

The adjustable mirror holders, if included, secure and adjust the first reflective surface 1310, the second reflective surface 1311, the third reflective surface 1312, and/or the fourth reflective surface 1313, such that an image entering the first incoming image aperture 2055 or the second incoming image aperture 2056 can be reflected off certain of the reflective surfaces of the component mirrors, so as to exit the outgoing image aperture 2057 at a determined offset that is horizontally offset and parallel or near parallel to the direct image pathway 110.

The second reflective surface 1311 (right hand mirror) is set at approximately 135 degrees to the optical targeting device 130, while the third reflective surface 1312 (left hand mirror) is set at approximately 225 degrees to the optical targeting device 130. Thus, as illustrated, the combination of the second reflective surface 1311 and the third reflective surface 1312 creates an approximate angle of 90 degrees.

The first reflective surface 1310 (right hand mirror) is set at approximately 135 degrees to the optical targeting device 130, while the fourth reflective surface 1313 (left hand mirror) is set at approximately 225 degrees to the optical targeting device 130. The combination of the first reflective surface 1310 and the fourth reflective surface 1313 makes an approximate angle of 90 degrees.

It should be appreciated that the approximate angles are merely exemplary and multiple angles and configurations may be utilized to realign the first offset image pathway 1390 and the second offset image pathway 1391 to the optical targeting device 130.

Figure 8:
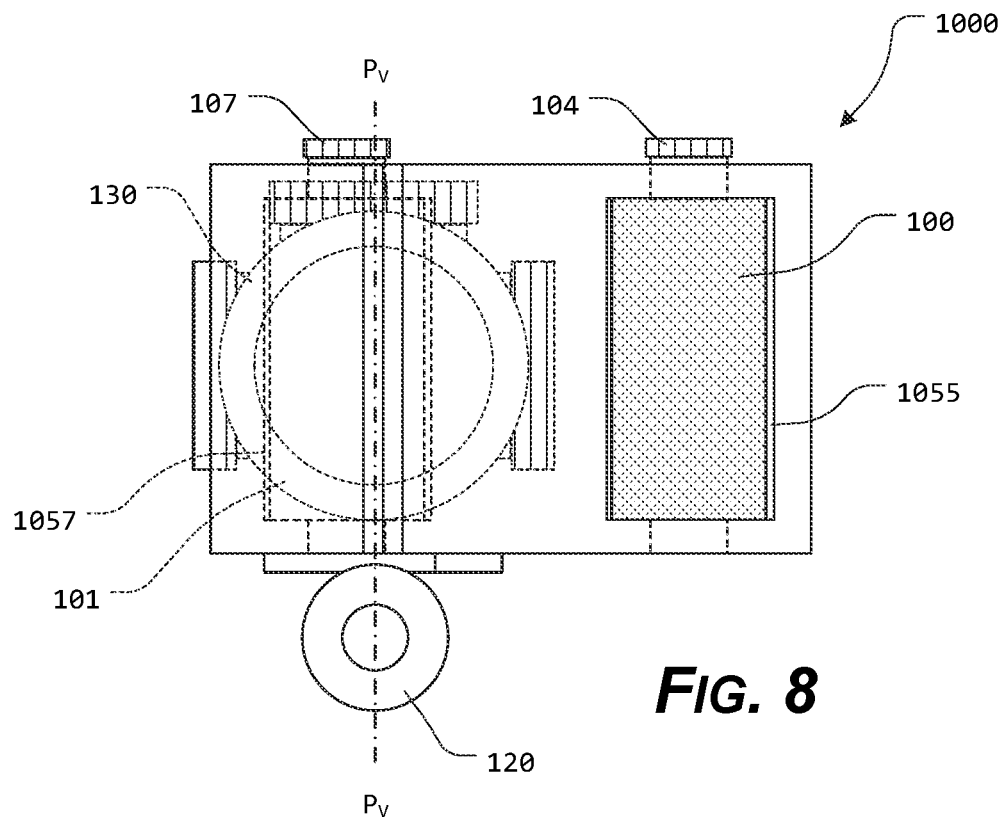
FIG. 8 illustrates a front view of an exemplary diagram of an image offsetting device and/or system, according to the present disclosure.
Figure 9:
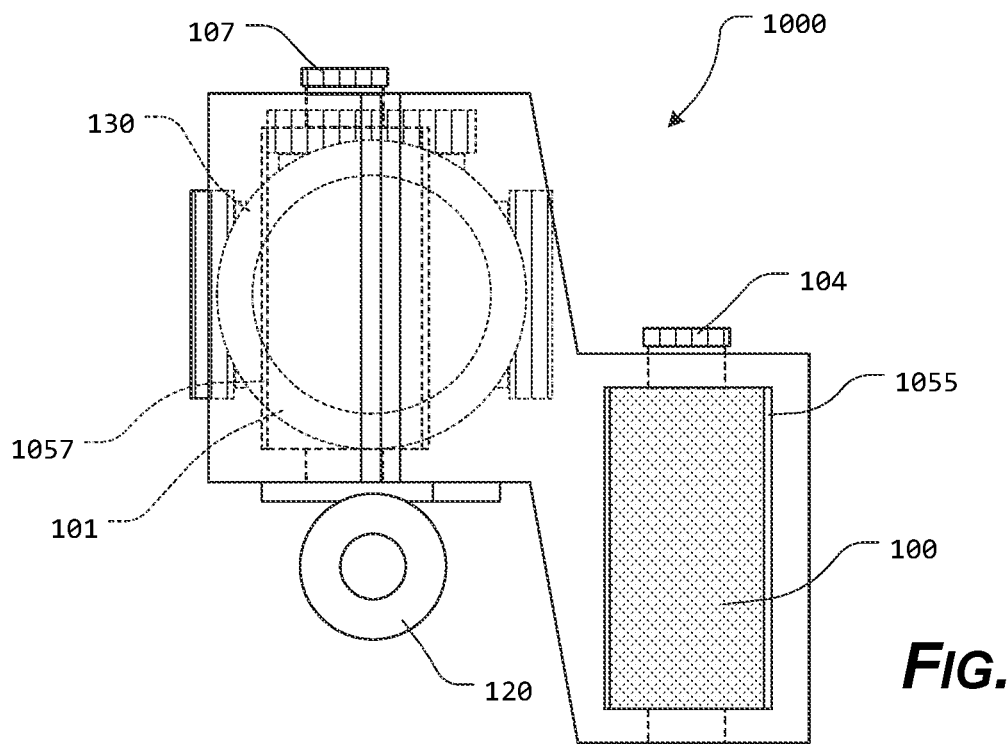
FIG. 9 illustrates a front view of an exemplary diagram of an image offsetting device and/or system, according to the present disclosure.

In various exemplary embodiments, first reflective surface 1310, second reflective surface 1311, third reflective surface 1312, and fourth reflective surface 1313 may each optionally be mounted on a rotatable base, similar to the rotatable base(s) as illustrated in FIG. 8 and FIG. 9.

It should be appreciated that while the first reflective surface 1310, the second reflective surface 1311, the third reflective surface 1312, and the fourth reflective surface 1313 are illustrated as being contained within the image offsetting apparatus 2000 as a complete unit, one or more of the first reflective surface 1310, the second reflective surface 1311, the third reflective surface 1312, and/or the fourth reflective surface 1313 may be positioned outside of a housing.

The third reflective surface 1312 and the fourth reflective surface 1313 look at an image with a field of view that overlaps. The overlap allows one to recombine an image similar to a set of binoculars.

In various exemplary embodiments, the first reflective surface 1310, the second reflective surface 1311, the third reflective surface 1312, and/or the fourth reflective surface 1313 comprises surface flat glass mirrors. However, it should be appreciated that this is merely exemplary and not limiting. Therefore, the reflection of the images can be accomplished thru a variety of known or later developed devices, systems, and/or methods.

In various exemplary embodiments, the housing 2050 represents the housing the optics would be placed in. While housing 2050 is presented as a simple rectangle, a plethora of shapes and surfaces could be produced to hold the components of the image offsetting apparatus 2000.

As illustrated, the image offsetting apparatus 2000 is typically positioned on the same plane as the primary optic axis referred to as the direct image pathway 110. As illustrated, the direct image pathway 110 is not in the same position as bore axis 105.

The first offset image pathway 1390, as viewed from the top, user's eye(s) 50 point of view, provides the right image path. The second offset image pathway 1391 as viewed from the top, user's eye(s) 50 point of view, provides the left image path. Although the first offset image pathway 1390 and the second offset image pathway 1391 are shown to be substantially parallel in this representation, they are not limited in angle to one another.

The image offsetting apparatus 2000 represents base components required to send the image target object 90 to the optical targeting device 130.

In various exemplary, nonlimiting embodiments, the output side of the first offset image pathway 1390 and/or the second offset image pathway 1391 may optionally be adjusted for correction of the system or zeroing of the system allowing the device to be placed on any platform without any need for a truing event. In certain exemplary embodiments, and adjustment could be made with a wedge style prism as disclosed in U.S. Pat. No. 10,444,525, issued Oct. 15, 2019, entitled Methods for Producing an Optical Wedge or Prism Assembly. Incorporation of a wedge style prism could allow an external adjustment or be used in conjunction with the internal adjustments provided by the rotating rods.

During use, an image of the target object 90 travels along the first offset image pathway 1390 and enters the first incoming image aperture 2055. The image of the target object 90 is reflected by the third reflective surface 1312 to the second reflective surface 1311. The image of the target object 90 is then reflected by the second reflective surface 311 through the outgoing image aperture 2057 and to the optical targeting device 130. Simultaneously, an image of the target object 90 travels along the second offset image pathway 1391 and enters the second incoming image aperture 2056. The image of the target object 90 is reflected by the fourth reflective surface 1313 to the first reflective surface 1310. The image of the target object 90 is then reflected by the first reflective surface 1310 through the outgoing image aperture 2057 and to the optical targeting device 130.

A variety of known or later developed reflecting and/or transmission solutions may be utilized. For example, in various exemplary embodiments, a prism 1355 is provided, having a prism body with one or more mirrored surfaces. In various exemplary embodiments, the prism 1355 may utilize internal reflection. Multiple types of prism bodies could be used as a standalone component or in conjunction with mirrored surfaces and other interacting optical components.

In certain exemplary embodiments, the prism 1355 may optionally include reflective surfaces 1350 and 1351. Reflective surfaces 1350 and 1351 represent a prism on the right side of the system. In this exemplary embodiment, an incoming image strikes reflective surface 1350 and is reflected at 90 degrees to the reflective surface 1351. The image is then reflected to the optical targeting device 130.

In various exemplary embodiments, the prism 1355 may optionally include reflective surfaces 1352 and 1353. Reflective surfaces 1352 and 1353 represent a prism on the left side of the system. In this exemplary embodiment, an incoming image strikes reflective surface 1352 and is reflected at 90 degrees to the reflective surface 1353. The image is then reflected to the optical targeting device 130.

Though two sides of symmetry are presented, systems that require a non-symmetrical solution may optionally be utilized.

Figure 24:
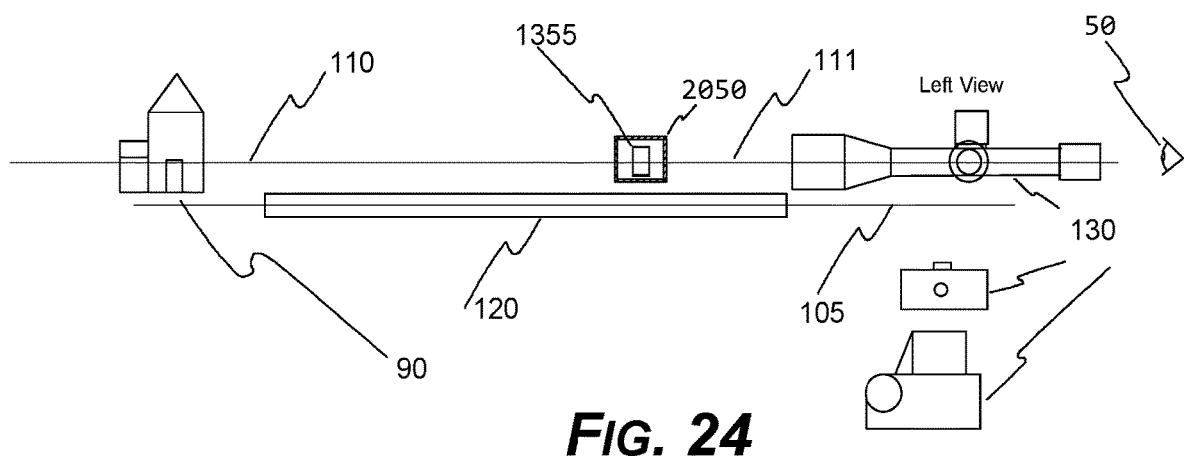
FIG. 24 illustrates a top view of certain exemplary components of an exemplary embodiment of an image offsetting device and/or system illustrated in conjunction with certain exemplary ancillary components, according to the present disclosure.
Figure 25A:
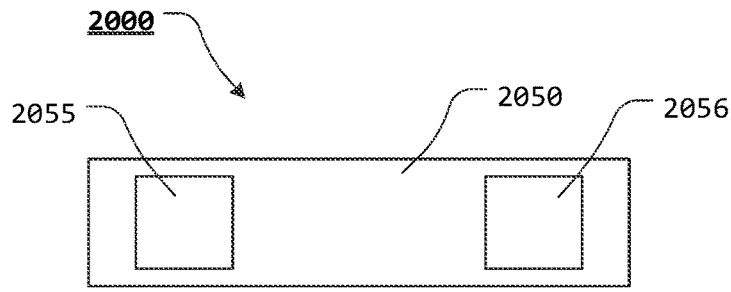
FIG. 25A illustrates a front view of an exemplary embodiment of an image offsetting device and/or system, according to the present disclosure.
Figure 25B:
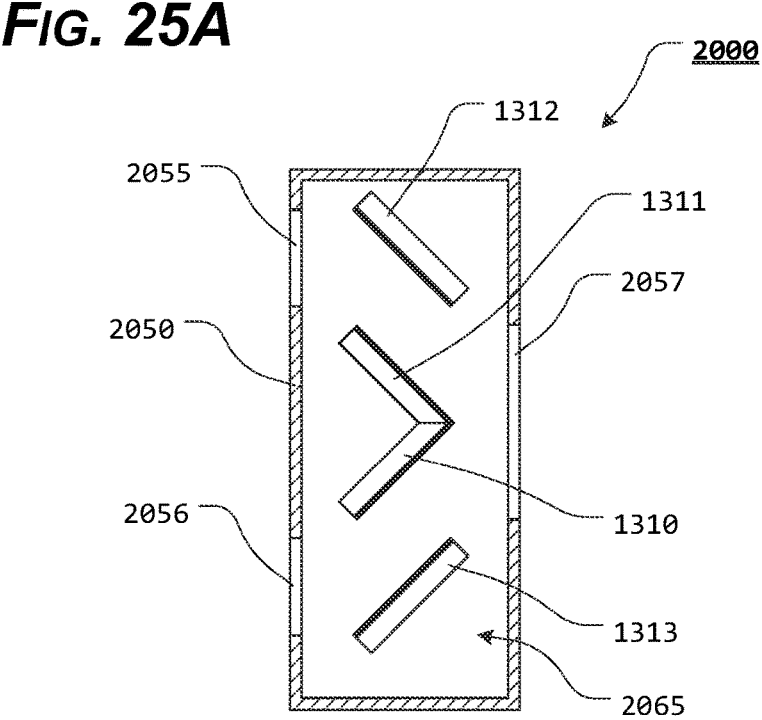
FIG. 25B illustrates a top, cross-sectional view of an exemplary embodiment of an image offsetting device and/or system, according to the present disclosure.
Figure 25C:
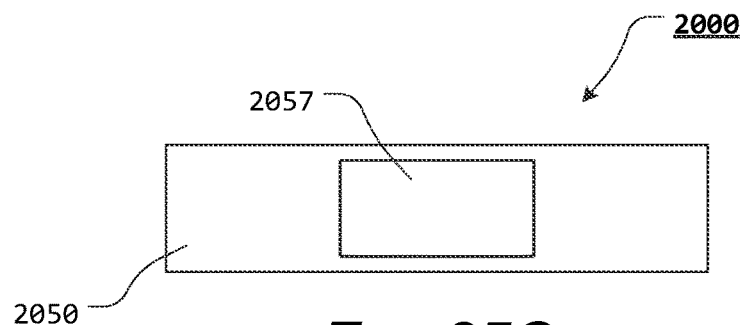
FIG. 25C illustrates a rear view of an exemplary embodiment of an image offsetting device and/or system, according to the present disclosure.

FIG. 24 shows a left hand view of the use of a prism or other reflecting device. External reflection, internal reflection, lens units, electronic lenses all could be used to combine multiple optical axis viewpoints. It should be appreciated that prism 1355 represents a prism body from FIG. 23. The system sits in a housing 2050.

Figure 26:
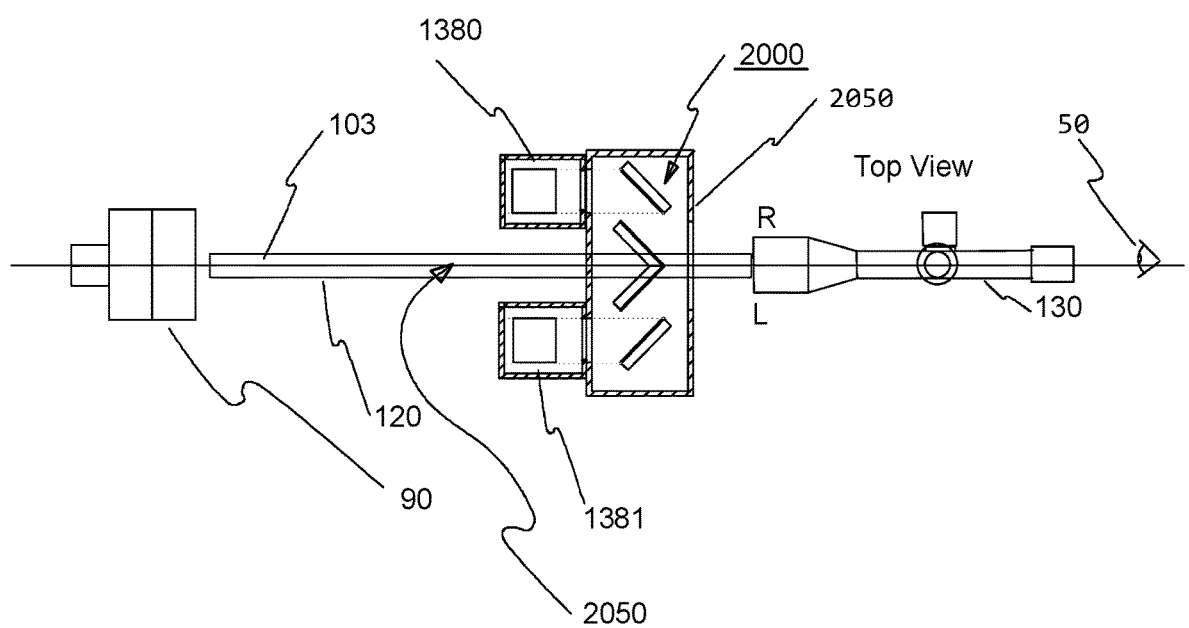
FIG. 26 illustrates a top view of certain exemplary components of an exemplary embodiment of an image offsetting device and/or system illustrated in conjunction with certain exemplary ancillary components, according to the present disclosure.
Figure 27:
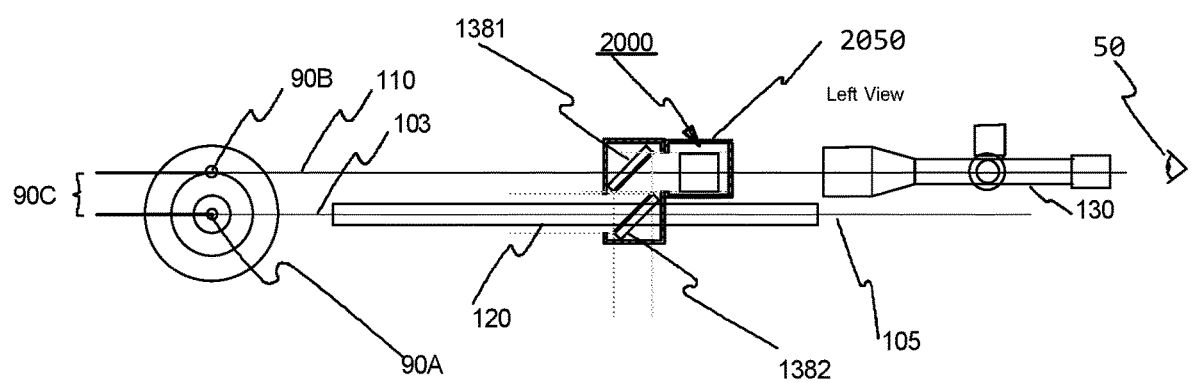
FIG. 27 illustrates a side view of certain exemplary components of an exemplary embodiment of an image offsetting device and/or system illustrated in conjunction with certain exemplary ancillary components, according to the present disclosure.

In FIG. 26 an alternate pathway is illustrated. This pathway creates an adjustable vertical offset.

Optical components are added along the same vertical position as the bore. While the bore axis is the chosen axis in this example, the system is not limited to the bore axis and could be applied to any required line of site or ballistic requirement as may be required for indirect fire.

1380 represents the right hand side of this second system 1381. 1381 represents the left hand side of the second system. In this view only the top mirrors are viewable in a top view. While two mirrors are shown in this position it should be appreciated that optical components may optionally be added or subtracted to accomplish the outputs of the optical targeting device 130.

The image offsetting apparatus 2100 represents the group of optics providing a vertical offset as compared to group image offsetting apparatus 2000, which is a left to right offset.

Housing 2050 is shown to split around barrel 120. An optic or receiver of some type would be placed on each side of the barrel 120 is this example. It should be appreciated that further components may be added to create further pathways.

Component 1381 is shown in its position. Typically at a height above detail 103 detail 103 the bore axis. The vast majority of current optical targeting devices are above the bore line 105.

Component 1382 is shown in its position. In this example, roughly equivalent to the bore height.

Figure 28:
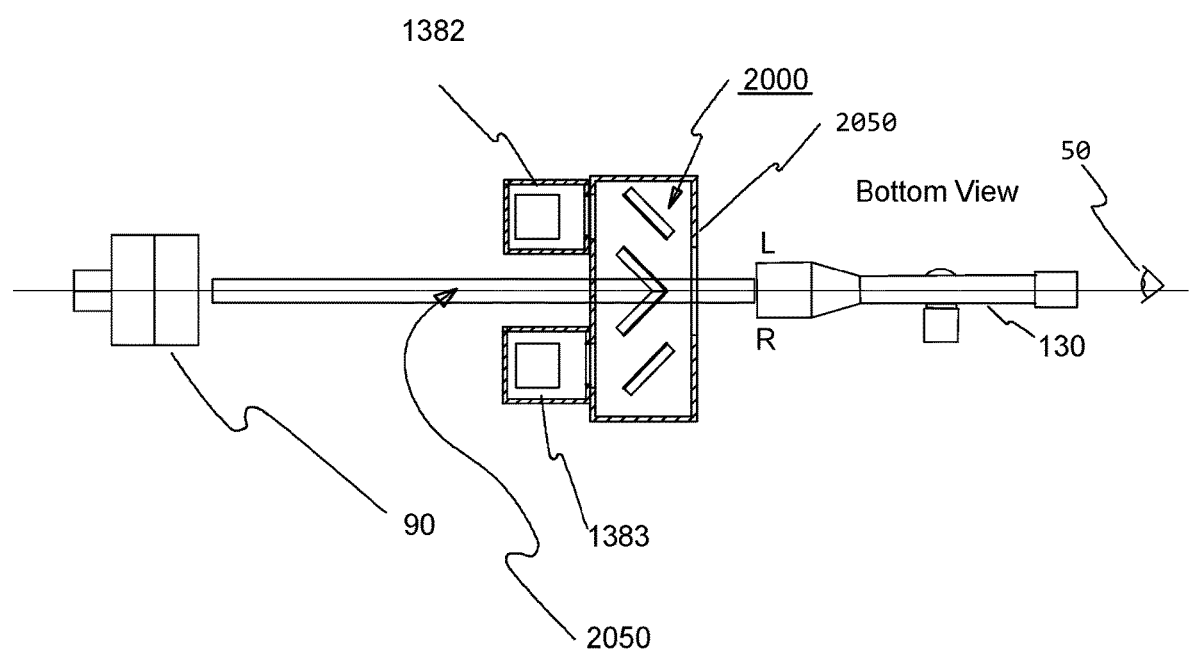
FIG. 28 illustrates a bottom view of certain exemplary components of an exemplary embodiment of an image offsetting device and/or system illustrated in conjunction with certain exemplary ancillary components, according to the present disclosure.

FIG. 28 is a bottom view of a potential optical system designed to co-align two axis.

The image offsetting apparatus 2000 and image offsetting apparatus 2100 allow both left and right of target object 90 image manipulation. The image offsetting apparatus 2000 allows left right manipulation. The image offsetting apparatus 2100 allows vertical manipulation. Near bore parallel result occurs through use of image offsetting apparatus 2100. This includes allowing a combination of off axis views at the optical targeting device 130 or user's eye(s) 50.

Components 1382 and 1383 represent left and right components as viewed from a bottom view.

All components are shown in housing 2050. It should be understood that a person of skill could employ materials such as sapphire optical components and expose many edges and faces if required.

Figure 29:
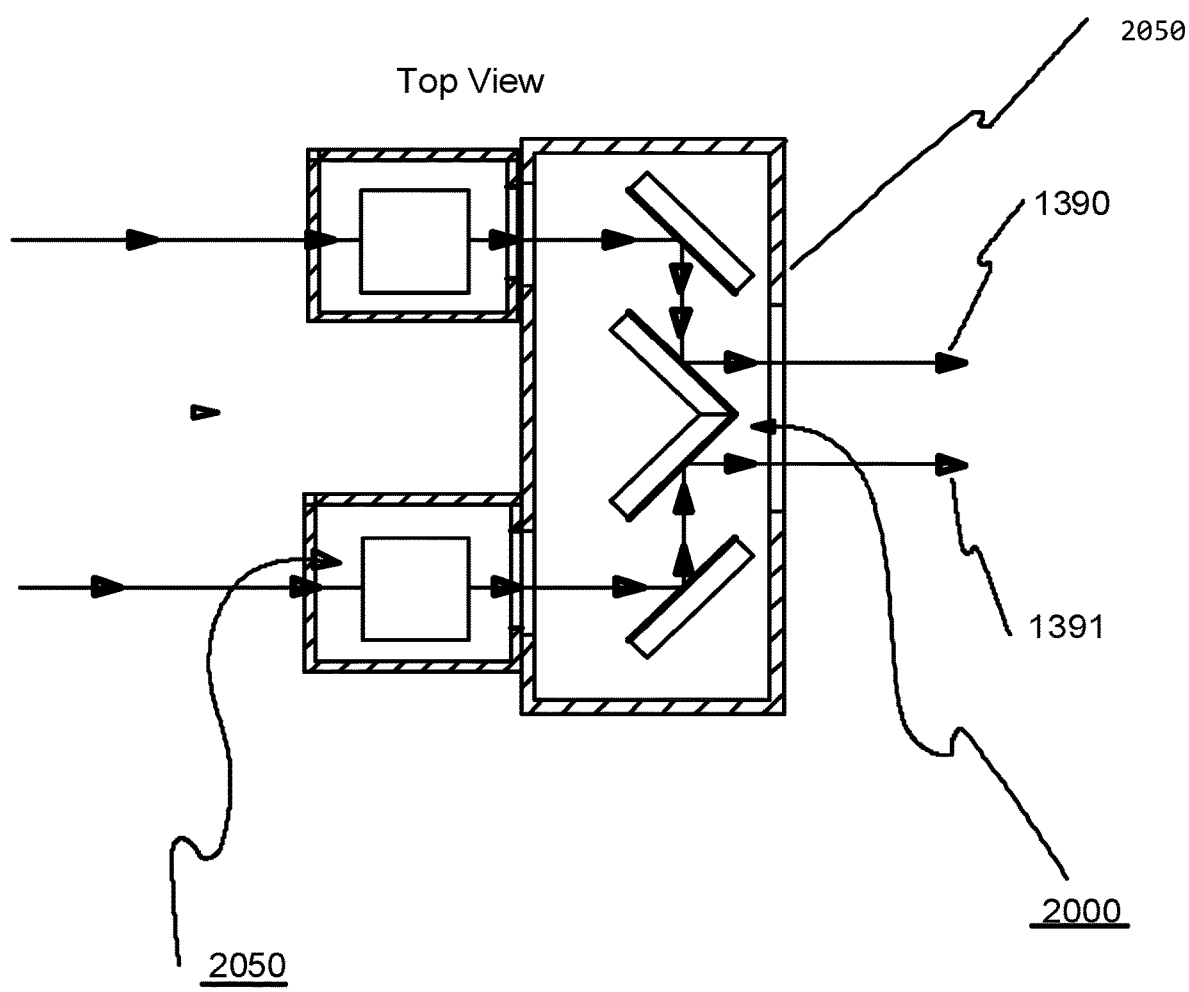
FIG. 29 illustrates a top, cross-sectional view of certain exemplary components of an exemplary embodiment of an image offsetting device and/or system illustrated in conjunction with certain exemplary ancillary components, according to the present disclosure.

In FIG. 29 a top view of a typical first offset image pathway 1390 and second offset image pathway 1391 is shown.

The target object 90 object target object 90 image is represented by rays first offset image pathway 1390 and second offset image pathway 1391.

The first offset image pathway 1390 and second offset image pathway 1391 are representative only and do not place second offset image pathway 1391 limits of configuration. A person of knowledge and skill can create multiple paths thru reflection and transmission to align two or more axis. The number of optical elements is also representative only.

Detail second offset image pathway 1391 which is the top view left side from the user's eye(s) 50 point of view, arrives from target object 90 target object 90.

The ray reflects off of detail 1382 in FIG. 140. In this example it reflects vertically at a target object 90 degrees angle to mirror 1381 in FIG. 29. The ray is reflected, in this case, along the same axis as the bore detail 103 and reflects off of mirror fourth reflective surface 1313 in FIG. 20. The ray will reflect, in this example, target object 90 degrees towards the centerline of the primary optic. It will then reflect target object 90 degrees, in this example, off of mirror first reflective surface 1310 in FIG. 20.

The ray will then continue towards the primary optic optical targeting device 130.

While "mirror" is used in much of the description, this could be any reflective surface and or lens assembly, prism assembly, photo detector 1420s, camera's as any person of reasonable skill could assemble.

Figure 30:
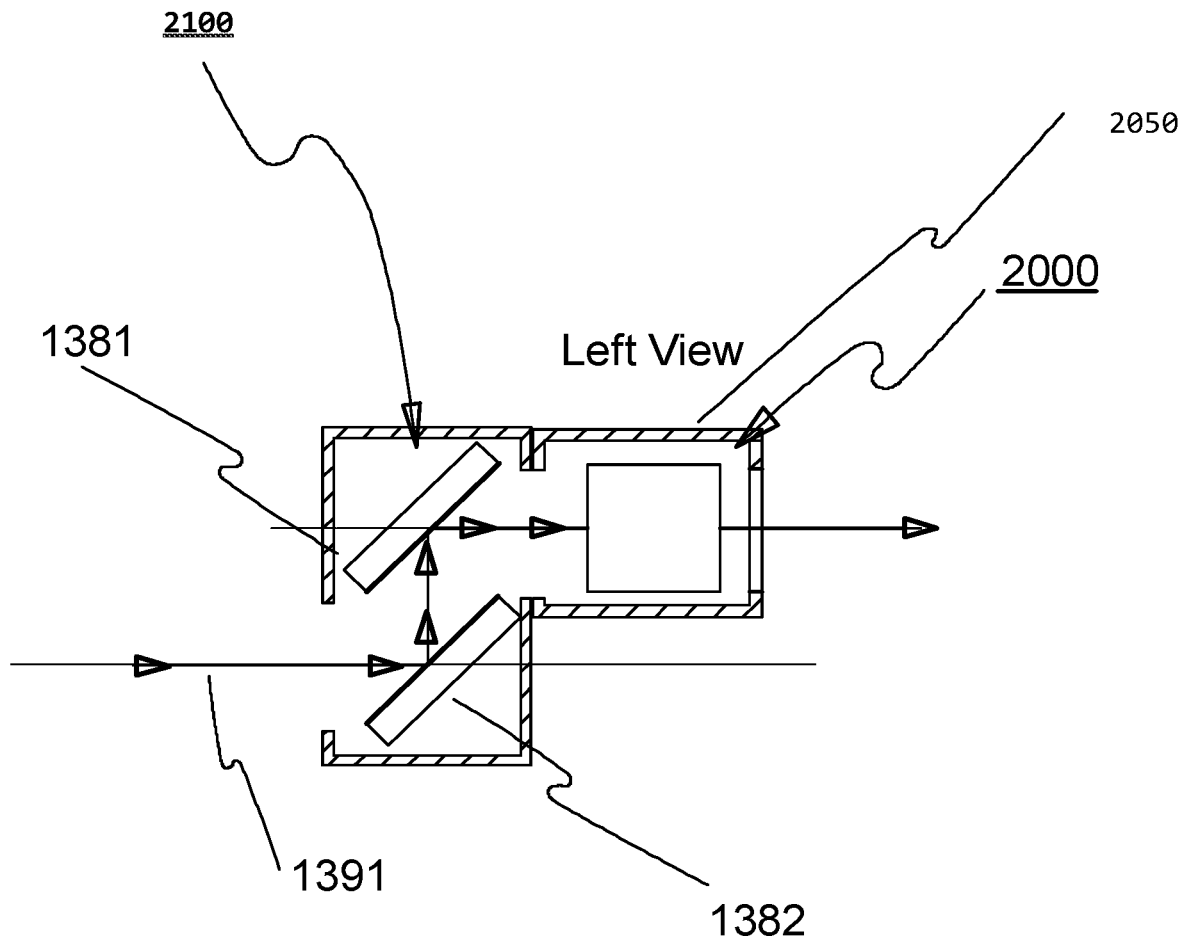
FIG. 30 illustrates a left side, cross-sectional view of certain exemplary components of an exemplary embodiment of an image offsetting device and/or system illustrated in conjunction with certain exemplary ancillary components, according to the present disclosure.

Ray paths represented by the first offset image pathway 1390 and second offset image pathway 1391 could be second offset image pathway 1391 replaced with various electronic devices such as Infrared components, night vision, coated day time optics, camera systems allowing an operator to switch modes of operation and still have an off axis image be presented to the primary optic. In FIG. 30 the components are viewed from the left side. The image offsetting apparatus 2000 represents components described in FIG. 20.

Components 1381 and 1382 are displayed and show their vertical separation.

The second offset image pathway 1391 is illustrated. The path of the second offset image pathway 1391 from the target object 90 to optical targeting device 130.

Figure 31:
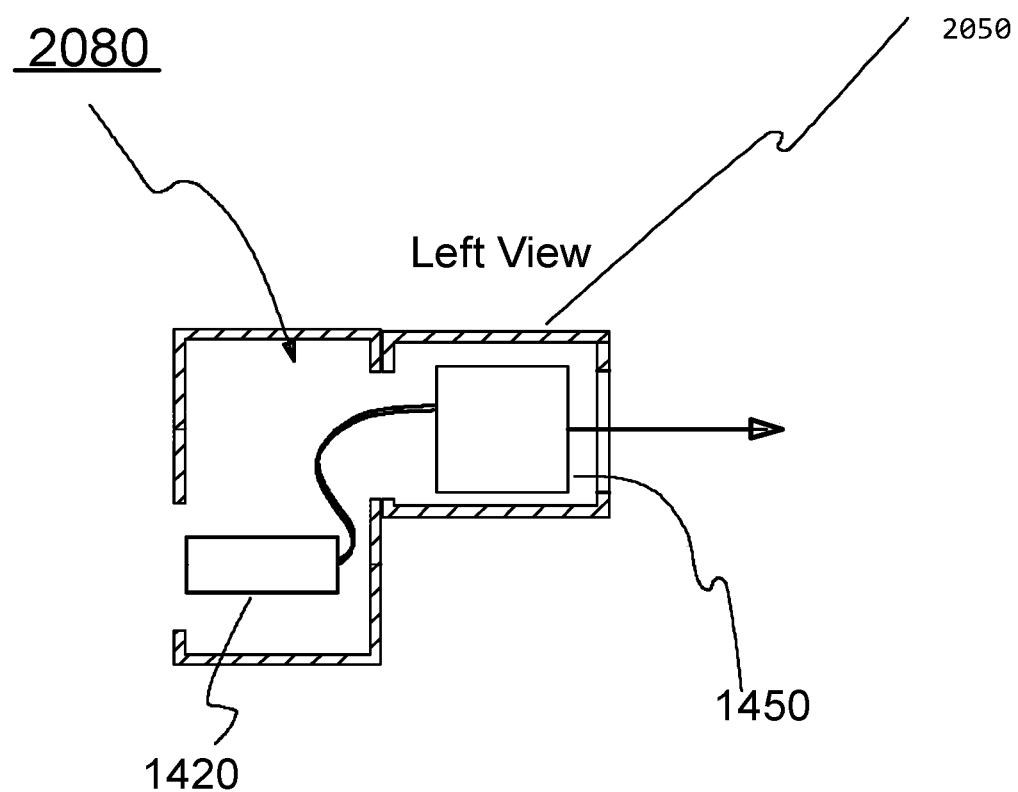
FIG. 31 illustrates a left side, cross-sectional view of certain exemplary components of an exemplary embodiment of an image offsetting device and/or system illustrated in conjunction with certain exemplary ancillary components, according to the present disclosure.

FIG. 31 introduces an electronic solution. Two or more photo receptors are used and then recombined to create a screen output or projected output. This is a left side view as viewed by user's eye(s) 50.

In various exemplary embodiments, a detector 1420 is included. The detector 1420 is not limited to the visual spectrum and all spectrums could be represented. An output device 1450 of the detector 1420 may also optionally be included. The output of the detector 1420 may optionally be directly input to an optical targeting device 130.

Figure 32:
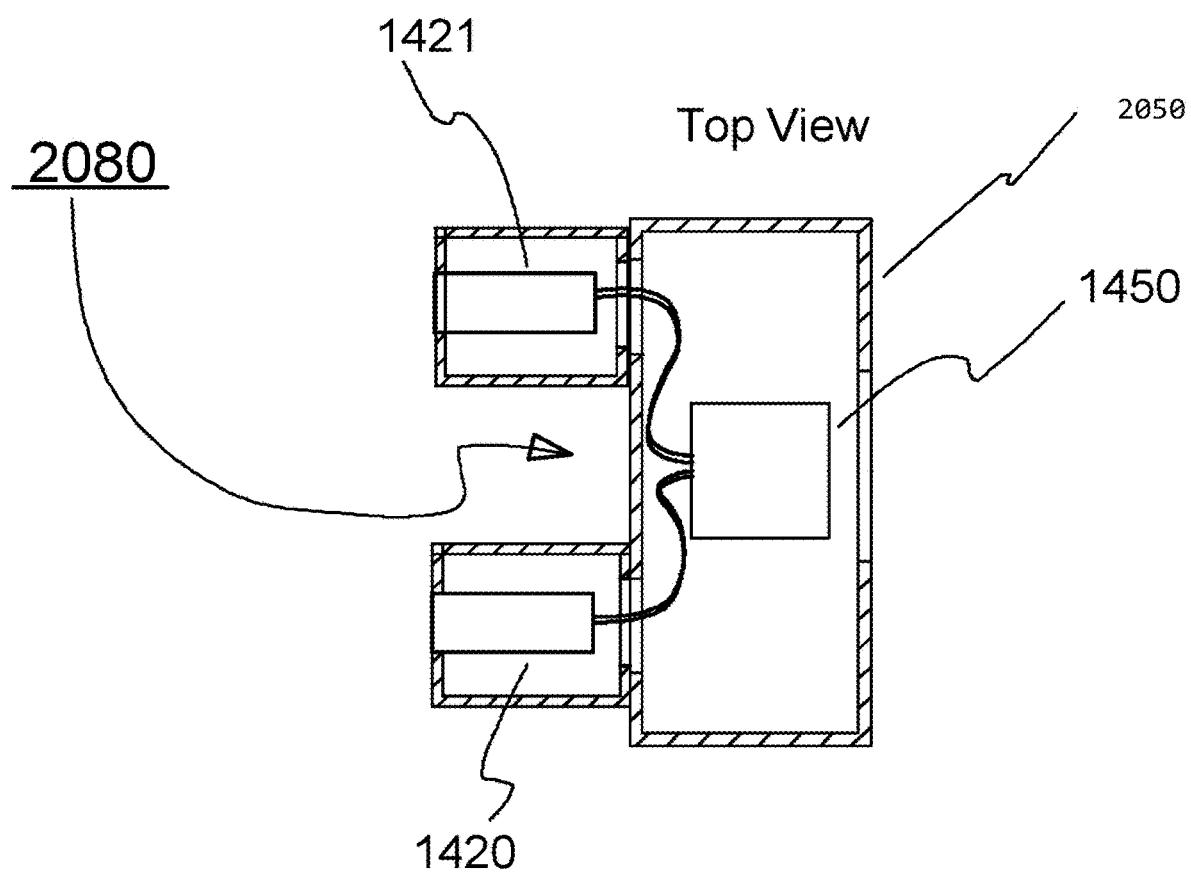
FIG. 32 illustrates a top, cross-sectional view of certain exemplary components of an exemplary embodiment of an image offsetting device and/or system illustrated in conjunction with certain exemplary ancillary components, according to the present disclosure.

The goal of using multiple positions of device detector 1420 is to create a singular view of a target object 90 including at extremely close range. This could be as low a one foot or less. FIG. 32A top view is shown in FIG. 32.

Left and right detectors 1420 are illustrated as detector 1421 and detector 1420, and optionally form detector group 2080.

The foregoing description and accompanying drawings illustrate the principles, preferred embodiments, and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

It should also be appreciated that a more detailed explanation of the instructions regarding how to attach or couple the image offsetting apparatus 1000 to a rifle or other device, and certain other items and/or techniques necessary for the implementation and/or operation of the various exemplary embodiments of the presently disclosed systems, methods, and/or apparatuses are not provided herein because such elements are commercially available and/or such background information will be known to one of ordinary skill in the art. Therefore, it is believed that the level of description provided herein is sufficient to enable one of ordinary skill in the art to understand and practice the presently disclosed systems, methods, and/or apparatuses, as described.

While the presently disclosed systems, methods, and/or apparatuses has been described in conjunction with the exemplary embodiments outlined above, the foregoing description of exemplary embodiments of the presently disclosed systems, methods, and/or apparatuses, as set forth above, are intended to be illustrative, not limiting and the fundamental disclosed systems, methods, and/or apparatuses should not be considered to be necessarily so constrained. It is evident that the presently disclosed systems, methods, and/or apparatuses is not limited to the particular variation set forth and many alternatives, adaptations modifications, and/or variations will be apparent to those skilled in the art.

Furthermore, where a range of values is provided, it is understood that every intervening value, between the upper and lower limit of that range and any other stated or intervening value in that stated range is encompassed within the presently disclosed systems, methods, and/or apparatuses. The upper and lower limits of these smaller ranges may independently be included in the smaller ranges and is also encompassed within the presently disclosed systems, methods, and/or apparatuses, subject to any specifically excluded limit in the stated range. Where the stated range includes one or both of the limits, ranges excluding either or both of those included limits are also included in the presently disclosed systems, methods, and/or apparatuses.

It is to be understood that the phraseology of terminology employed herein is for the purpose of description and not of limitation. Unless defined otherwise, all technical and scientific terms used herein have the same meaning as commonly understood by one of ordinary skill in the art to which the presently disclosed systems, methods, and/or apparatuses belongs.

In addition, it is contemplated that any optional feature of the inventive variations described herein may be set forth and claimed independently, or in combination with any one or more of the features described herein.

Accordingly, the foregoing description of exemplary embodiments will reveal the general nature of the presently disclosed systems, methods, and/or apparatuses, such that others may, by applying current knowledge, change, vary, modify, and/or adapt these exemplary, non-limiting embodiments for various applications without departing from the spirit and scope of the presently disclosed systems, methods, and/or apparatuses and elements or methods similar or equivalent to those described herein can be used in practicing the presently disclosed systems, methods, and/or apparatuses. Any and all such changes, variations, modifications, and/or adaptations should and are intended to be comprehended within the meaning and range of equivalents of the disclosed exemplary embodiments and may optionally be substituted without departing from the true spirit and scope of the presently disclosed systems, methods, and/or apparatuses.

Also, it is noted that as used herein and in the appended claims, the singular forms "a", "and", "said", and "the" include plural referents unless the context clearly dictates otherwise. Conversely, it is contemplated that the claims may be so-drafted to require singular elements or exclude any optional element indicated to be so here in the text or drawings. This statement is intended to serve as antecedent basis for use of such exclusive terminology as "solely", "only", and the like in connection with the recitation of claim elements or the use of a "negative" claim limitation(s).

What is claimed is:

1. A dual image offsetting apparatus for producing a first offset image pathway and a discrete, second offset image pathway and presenting said offset image pathways to a user or an optical targeting device, comprising:

a first reflective surface, a second reflective surface, a third reflective surface, and a fourth reflective surface, wherein said first reflective surface, said second reflective surface, said third reflective surface, and said fourth reflective surface are attached or coupled between said target object and said user or said optical targeting device so as to receive, on said first offset image pathway, a first target image of said target object through a first incoming image aperture and so as to receive, on said second offset image pathway, a second target image of said target object through a second incoming image aperture, reflect said first target image of said target object, on said first offset image pathway, through an outgoing image aperture, and reflect said second target image of said target object, on said second offset image pathway, through said outgoing image aperture, such that said first offset image pathway is offset from said second offset image pathway.

2. The dual image offsetting apparatus of claim 1, wherein a barrel, heat radiating from a barrel, or a forward mounted accessory does not intercept said offset image pathway between said target object and said user or said optical targeting device.

3. The dual image offsetting apparatus of claim 1, wherein said first reflective surface, said second reflective surface, said third reflective surface, and said fourth reflective surface are each rotatably positioned within at least a portion of an optical cavity of a housing.

4. The dual image offsetting apparatus of claim 1, wherein said second reflective surface is positionable so as to receive said first target image from said third reflective surface.

5. The dual image offsetting apparatus of claim 1, wherein said first target image is received through said first incoming image aperture, reflected from said third reflective surface to said second reflective surface and from said second reflective surface through said outgoing image aperture.

6. The dual image offsetting apparatus of claim 1, wherein said first reflective surface is positionable so as to receive said second target image from said fourth reflective surface.

7. The dual image offsetting apparatus of claim 3, wherein said second target image is received through said second incoming image aperture, reflected from said fourth reflective surface to said first reflective surface and from said first reflective surface through said outgoing image aperture.

8. A dual image offsetting apparatus for producing a first offset image pathway for a first target image of a target and a discrete, second offset image pathway for a second target image of a target and providing said offset target images to a user or an optical targeting device, comprising:

a housing having an optical cavity formed therein, wherein said optical cavity extends from a first incoming image aperture and a second incoming image aperture formed through a first portion of said housing to an outgoing image aperture formed through a second portion of said housing, wherein said housing is positionable between said user or said optical targeting device and a target; and a first reflective surface, a second reflective surface, a third reflective surface, and a fourth reflective surface, wherein said first reflective surface, said second reflective surface, said third reflective surface, and said fourth reflective surface are attached or coupled between said target object and said user or said optical targeting device so as to receive, on said first offset image pathway, a first target image of said target object through a first incoming image aperture and so as to receive, on said second offset image pathway, a second target image of said target object through a second incoming image aperture, reflect said first target image of said target object, on said first offset image pathway, through an outgoing image aperture, and reflect said second target image of said target object, on said second offset image pathway, through said outgoing image aperture, such that said first offset image pathway is offset from said second offset image pathway.

9. The dual image offsetting apparatus of claim 8, wherein rotational adjustment of said second reflective surface and/or said third reflective surface adjusts an angle at which said first target image is reflected through said outgoing image aperture.

10. The dual image offsetting apparatus of claim 8, wherein said second reflective surface is positionable so as to receive said first target image from said third reflective surface.

11. The dual image offsetting apparatus of claim 8, wherein said first target image is received through said first incoming image aperture, reflected from said third reflective surface to said second reflective surface and from said second reflective surface through said outgoing image aperture.

12. The dual image offsetting apparatus of claim 8, wherein rotational adjustment of said first reflective surface and/or said fourth reflective surface adjusts an angle at which said second target image is reflected through said outgoing image aperture.

13. The dual image offsetting apparatus of claim 8, wherein said first reflective surface is positionable so as to receive said second target image from said fourth reflective surface.

14. The dual image offsetting apparatus of claim 8, wherein said second target image is received through said second incoming image aperture, reflected from said fourth reflective surface to said first reflective surface and from said first reflective surface through said outgoing image aperture.

15. The dual image offsetting apparatus of claim 8, wherein said dual image offsetting apparatus is positionable between said user or said optical targeting device and said target.

16. A dual image offsetting apparatus for producing a first offset image pathway for a first target image of a target and a discrete, second offset image pathway for a second target image of a target and providing said offset target images to a user or an optical targeting device, comprising:
    a housing having an optical cavity formed therein, wherein said optical cavity extends from a first incoming image aperture and a second incoming image aperture formed through a first portion of said housing to an outgoing image aperture formed through a second portion of said housing; and
    a first reflective surface, a second reflective surface, a third reflective surface, and a fourth reflective surface, wherein said second reflective surface is positionable so as to receive said first target image from said third reflective surface, wherein said first target image is received through said first incoming image aperture, reflected from said third reflective surface to said second reflective surface and from said second reflective surface through said outgoing image aperture, wherein said first reflective surface is positionable so as to receive said second target image from said fourth reflective surface, wherein said second target image is received through said second incoming image aperture, reflected from said fourth reflective surface to said first reflective surface and from said first reflective surface through said outgoing image aperture, wherein said first reflective surface, said second reflective surface, said third reflective surface, and said fourth reflective surface are attached or coupled between said target object and said user or said optical targeting device so as to receive, on said first offset image pathway, a first target image of said target object through a first incoming image aperture and so as to receive, on said second offset image pathway, a second target image of said target object through a second incoming image aperture, reflect said first target image of said target object, on said first offset image pathway, through an outgoing image aperture, and reflect said second target image of said target object, on said second offset image pathway, through said outgoing image aperture, such that said first offset image pathway is offset from said second offset image pathway.

17. The dual image offsetting apparatus of claim 16, wherein said housing is positionable between said user or said optical targeting device and a target.

18. The dual image offsetting apparatus of claim 16, wherein said first reflective surface, said second reflective surface, said third reflective surface, and said fourth reflective surface are each rotatably positioned within at least a portion of an optical cavity of a housing.

19. The dual image offsetting apparatus of claim 16, wherein rotational adjustment of said second reflective surface and/or said third reflective surface adjusts an angle at which said first target image is reflected through said outgoing image aperture.

20. The dual image offsetting apparatus of claim 16, wherein rotational adjustment of said first reflective surface and/or said fourth reflective surface adjusts an angle at which said second target image is reflected through said outgoing image aperture.

\* \* \* \* \*